(12) United States Patent
Jansen et al.

(10) Patent No.: US 11,564,375 B2
(45) Date of Patent: Jan. 31, 2023

(54) CANINE MULTI-MEAL KIT

(71) Applicant: Fenris LLC, Lakewood, CO (US)

(72) Inventors: Evan Jansen, Lakewood, CO (US); Bret Hribar, Castle Rock, CO (US); Matthew Lerch, Parker, CO (US)

(73) Assignee: FENRIS, LLC, Lakewood, CO (US)

( * ) Notice: Subject to any disclaimer, the term of this patent is extended or adjusted under 35 U.S.C. 154(b) by 491 days.

(21) Appl. No.: 16/704,103

(22) Filed: Dec. 5, 2019

(65) Prior Publication Data

US 2021/0169042 A1 Jun. 10, 2021

(51) Int. Cl.
| | | |
|---|---|---|
| *A01K 5/01* | (2006.01) | |
| *B65D 81/32* | (2006.01) | |
| *B65D 25/04* | (2006.01) | |
| *B65D 85/72* | (2006.01) | |

(52) U.S. Cl.
CPC ............... *A01K 5/01* (2013.01); *B65D 25/04* (2013.01); *B65D 81/3205* (2013.01); *B65D 85/72* (2013.01)

(58) Field of Classification Search
CPC .. B65D 75/305; B65D 81/32; B65D 81/3294; B65D 5/0085; B65D 25/04; B65D 81/3205; B65D 85/72; A01K 5/0114; A01K 5/01
USPC ........ 206/583, 557–567, 520; 220/6–7, 4.01, 220/520, 4.21–4.27
See application file for complete search history.

(56) References Cited

U.S. PATENT DOCUMENTS

| | | | | | |
|---|---|---|---|---|---|
| 2,858,224 | A | * | 10/1958 | Darrah ............... | B65D 81/2076 |
| | | | | | 206/521.1 |
| 4,241,863 | A | * | 12/1980 | Faller .................... | B65D 77/00 |
| | | | | | 229/120.09 |
| 5,183,159 | A | * | 2/1993 | Hojnacki ............. | B65D 81/075 |
| | | | | | 206/583 |
| 5,312,634 | A | * | 5/1994 | Griesbach .......... | B65D 81/3294 |
| | | | | | 426/106 |

(Continued)

FOREIGN PATENT DOCUMENTS

| | | |
|---|---|---|
| CA | 2566442 C | 10/2009 |
| FR | 2847769 B1 | 12/2002 |

(Continued)

OTHER PUBLICATIONS

International Search Report and Written Opinion received for PCT Patent Application No. PCT/US2020/059643, dated Feb. 3, 2021, 13 pages.

(Continued)

*Primary Examiner* — Chun Hoi Cheung
(74) *Attorney, Agent, or Firm* — Shook, Hardy & Bacon L.L.P.

(57) ABSTRACT

A canine multi-meal kit is provided herein. The kit comprises at least two containers, each container storing one dehydrated canine meal, in aspects. Each dehydrated canine meal is sealed within a container in an airtight manner by a containment structure. Each containment structure partitions a container into a volume occupied by a canine meal and another volume that is not occupied by the canine meal, as the volume of the canine meal is less than the total volume of the corresponding container. In one aspect, items are stored at least partially within the unoccupied volume of the containers when the kit is in an enclosed configuration.

17 Claims, 18 Drawing Sheets

(56) References Cited

U.S. PATENT DOCUMENTS

| | | | |
|---|---|---|---|
| 5,752,464 A | 5/1998 | King et al. | |
| 5,925,390 A * | 7/1999 | Kornacki | A01K 5/0121 |
| | | | 119/61.5 |
| 6,124,407 A | 9/2000 | Lee et al. | |
| 6,248,377 B1 | 6/2001 | Levine | |
| 6,568,347 B2 * | 5/2003 | Giguere | A01K 5/0114 |
| | | | 206/541 |
| 6,669,975 B1 | 12/2003 | Abene et al. | |
| 7,263,949 B1 | 9/2007 | Seaford | |
| 8,684,218 B1 * | 4/2014 | Stravitz | F16B 47/00 |
| | | | 220/4.03 |
| 9,173,728 B2 | 11/2015 | Wurtz | |
| 2001/0048955 A1 | 12/2001 | Foreman et al. | |
| 2001/0048995 A1 | 12/2001 | Eschenfelder et al. | |
| 2002/0083900 A1 | 7/2002 | Williams | |
| 2003/0026876 A1 | 2/2003 | Albuja et al. | |
| 2005/0269218 A1 * | 12/2005 | Sunvoid | A01K 5/0114 |
| | | | 206/219 |
| 2006/0042995 A1 * | 3/2006 | McGrath | B65D 43/162 |
| | | | 206/583 |
| 2008/0138473 A1 * | 6/2008 | Pawlick | A23L 5/10 |
| | | | 426/396 |
| 2008/0299260 A1 | 12/2008 | Strahm | |
| 2008/0302307 A1 | 12/2008 | Bertsch et al. | |
| 2009/0047394 A1 * | 2/2009 | Willcocks | B65B 31/00 |
| | | | 426/106 |
| 2011/0318457 A1 * | 12/2011 | Daniel | B65D 81/3294 |
| | | | 426/115 |
| 2012/0034348 A1 | 2/2012 | Bennie, Jr. | |
| 2012/0129785 A1 | 5/2012 | Fleuranges et al. | |
| 2015/0132446 A1 | 5/2015 | Cox | |
| 2015/0284138 A1 | 10/2015 | Lane et al. | |
| 2016/0058032 A1 | 3/2016 | Pettyan | |
| 2016/0073659 A1 | 3/2016 | Zemel et al. | |
| 2016/0366912 A1 | 12/2016 | Hewson-hughes et al. | |

FOREIGN PATENT DOCUMENTS

| | | |
|---|---|---|
| JP | 6124407 B2 | 5/2017 |
| WO | 2006124675 A2 | 11/2006 |

OTHER PUBLICATIONS

International Preliminary Report on Patentability received for PCT Application No. PCT/US2020/059643, dated Jun. 16, 2022, 12 pages.

* cited by examiner

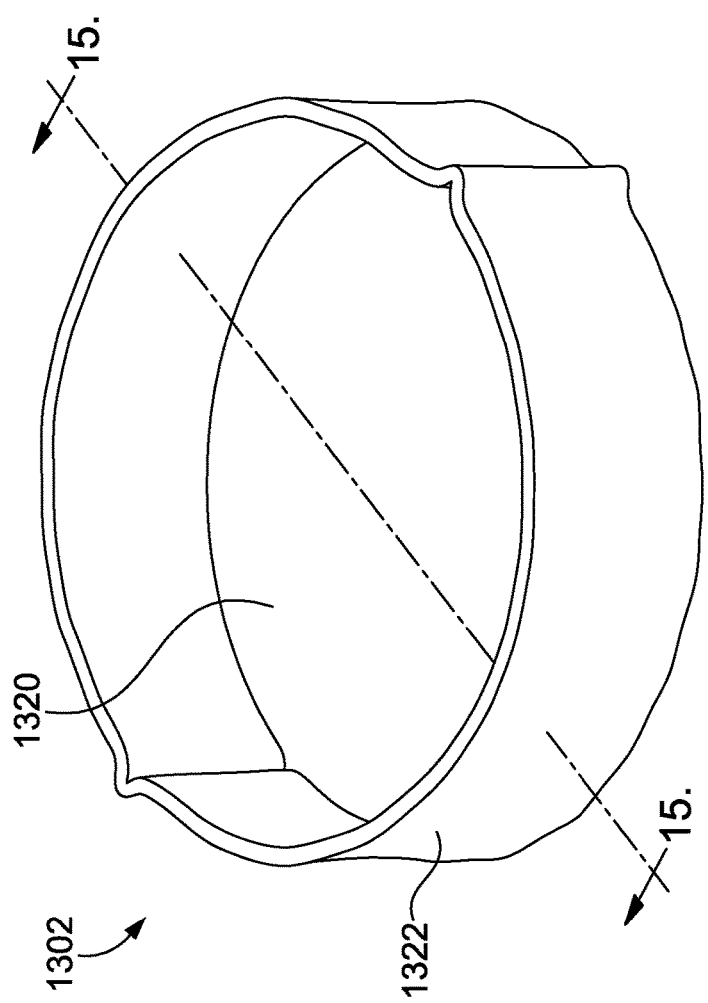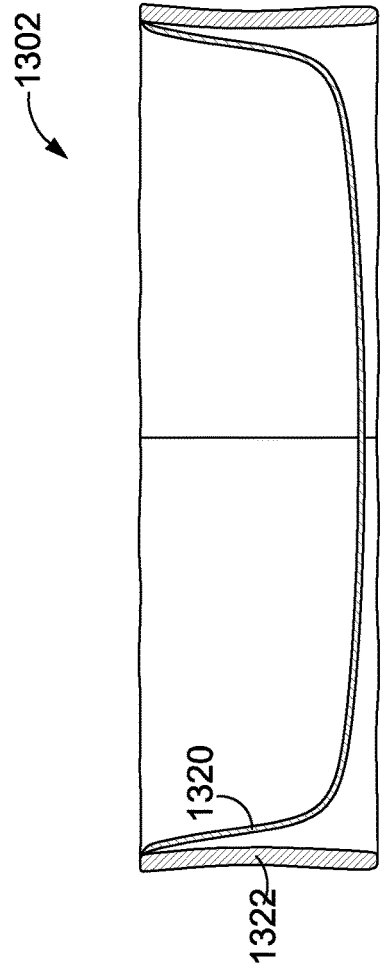

CANINE MULTI-MEAL KIT

BACKGROUND

Canine meals generally comprise dry kibble stored in large bags. The bags store a single large quantity of dry kibble to provide months of meals. Thus, dry kibble is manually portioned at each meal. The large bags are also impractical to transport due to limited cargo space and fuel costs. The large bags are further unwieldy and difficult to transport due to their large size, appreciable weight, and flaccid structure (i.e., shape of the bag changes when kibble shifts within the bag). Further still, the bags are often constructed from cheap materials that are prone to rips, tears, and punctures. The weak construction and the use of air and moisture permeable materials for the bags fail to protect the dry kibble from insects, vermin, other pests, rot, mold, and spoilage.

SUMMARY

At a high level, aspects of the present invention provide for a canine multi-meal kit. In aspects, the canine multi-meal kit comprises a first container having a first container volume. The canine multi-meal kit comprises a second container having a second container volume, in some aspects, wherein the second container and the first container are configured to selectively mate to enclose the first container volume and the second container volume. In an aspect, the canine multi-meal kit comprises a first dry food ration of a first dry food ration volume and a second dry food ration of a second dry food ration volume. The canine multi-meal kit further comprises a first containment structure disposed in the first container and selectively forming an air-tight volume for maintaining the first dry food ration in the first container such that the first dry food ration contacts the first container and the first containment structure. In one aspect, the first dry food ration volume is less than the first container volume. In aspects, the canine multi-meal kit further comprises a second containment structure disposed in the second container and selectively forming an air-tight volume for maintaining the second dry food ration in the second container such that the second dry food ration contacts the second container and the second containment structure. In one aspect, the second dry food ration volume is less than the second container volume.

In an aspect, another canine multi-meal kit is provided. The canine multi-meal kit comprises a first container having a first container volume, the first container having an interior surface. The canine multi-meal kit further also comprises a first dry food ration of a first dry food ration volume disposed within the first container. The canine multi-meal kit further comprises, in aspects, a first containment structure disposed in the first container, the first containment structure having an interior surface and an exterior surface, wherein the first containment structure is attached to at least a portion the interior surface of the first container when selectively forming an air-tight volume for maintaining the first dry food ration in the first container such that the first dry food ration contacts the first container and the first containment structure. In one aspect, the first dry food ration volume is less than the first container volume. In aspects, the canine multi-meal kit further comprises a second container having a second container volume, the second container having an interior surface. In some aspects, the second container and the first container are configured to selectively mate to enclose the first container volume and the second container volume. The canine multi-meal kit further comprises a second dry food ration of a second dry food ration volume disposed within the second container, in an aspect. The canine multi-meal kit further comprises a second containment structure disposed in the second container, the second containment structure having an interior surface and an exterior surface. The second containment structure is attached to at least a portion of the interior surface of the second container when selectively forming an air-tight volume for maintaining the second dry food ration in the second container such that the second dry food ration contacts the second container and the second containment structure, in an aspect. In one aspect, the second dry food ration volume is less than the second container volume.

Yet another canine multi-meal kit is provided herein. The canine multi-meal kit further comprises a first container having a first container volume, the first container having an interior surface. In an aspect, the canine multi-meal kit comprises a first dry food ration of a first dry food ration volume disposed within the first container. The canine multi-meal kit further comprises, in aspects, a first containment structure disposed in the first container, the first containment structure having an interior surface. The first containment structure is attached to at least a portion the interior surface of the first container when selectively forming an air-tight volume for maintaining the first dry food ration in the first container such that the first dry food ration contacts the first container and the first containment structure, in aspect. The first containment structure partitions the first container volume into the air-tight volume occupied by the first dry food ration volume and a first unoccupied volume of the first container volume that is not occupied by the first dry food volume, in one aspect. In some aspects, the first dry food ration volume is less than the first container volume. Continuing, the canine multi-meal kit further comprises a second container having a second container volume, the second container having an interior surface. The second container and the first container configured to selectively mate to enclose the first container volume and the second container volume, in some aspects. In an aspect, the canine multi-meal kit comprises a second dry food ration of a second dry food ration volume disposed within the second container. The canine multi-meal kit further comprises a second containment structure disposed in the second container, the second containment structure having an interior surface. The second containment structure is attached to at least a portion of the interior surface of the second container when selectively forming an air-tight volume for maintaining the second dry food ration in the second container such that, in aspects, the second dry food ration contacts the second container and the second containment structure. In an aspect, the second containment structure partitions the second container volume into the air-tight volume occupied by the second dry food ration volume and a second unoccupied volume of the second container volume that is not occupied by the second dry food volume. In one aspect, the second dry food ration volume is less than the second container volume. In further aspects, one or more items are stored at least partially within the first unoccupied volume of the first container volume and the second unoccupied volume of the second container when in the enclosed configuration.

BRIEF DESCRIPTION OF THE DRAWINGS

The present aspects are described in detail below with reference to the attached drawing figures, wherein:

FIGS. 14 and 15 depict additional perspective views of the canine kit of FIG. 13 shown in a different configuration, in accordance with an aspect herein;

DETAILED DESCRIPTION

The subject matter of the present invention is being described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments set forth herein. Moreover, although components are described herein with terms such as "first" or "second," these terms should not be interpreted as implying any sequence, order, quantity, and/or dependence with regard to components of the canine multi-meal kit 100 unless explicitly described otherwise.

Figure 1:
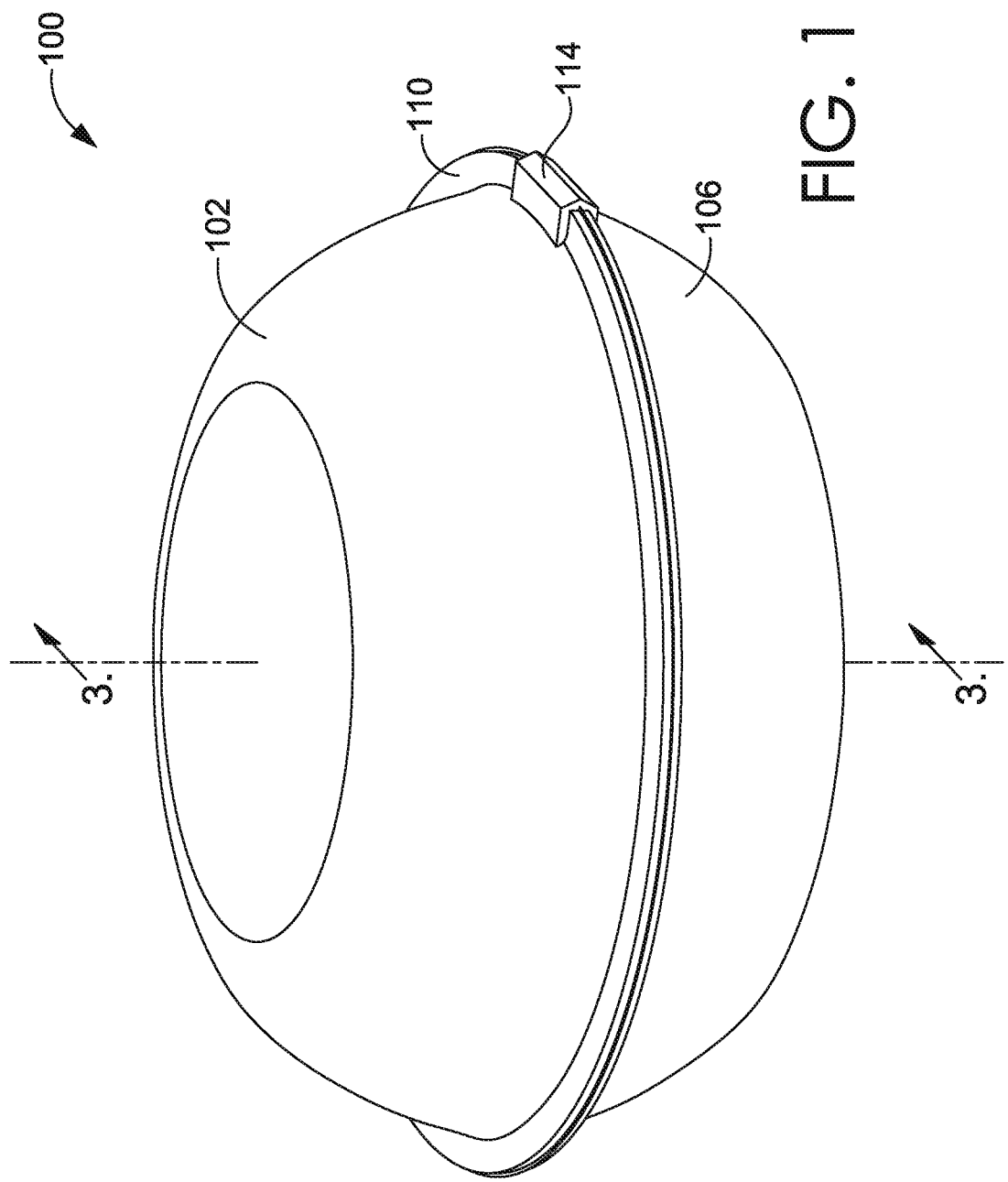
FIG. 1 depicts a perspective view of a canine multi-meal kit in an enclosed configuration, in accordance with an aspect herein.
Figure 2:
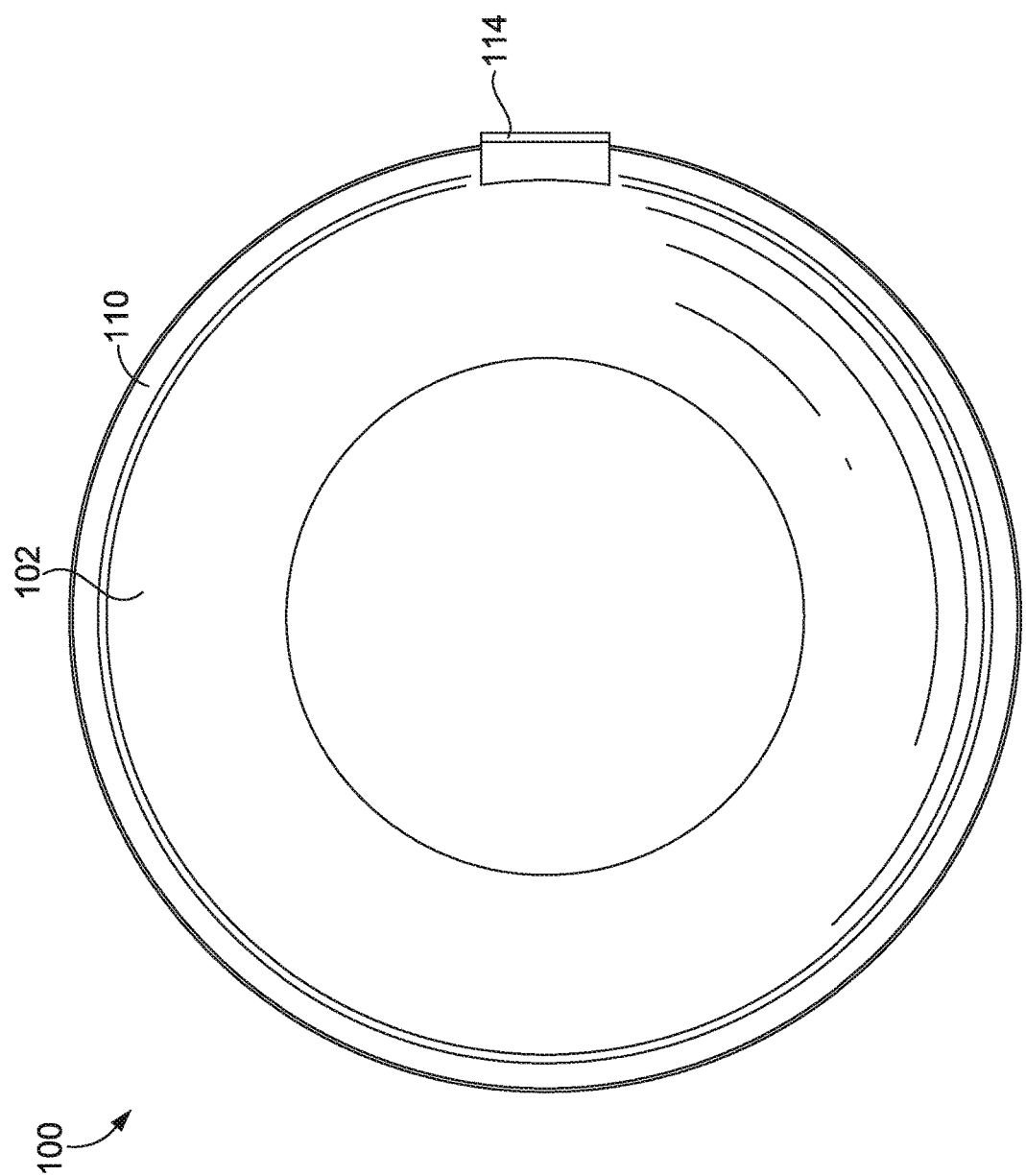
FIG. 2 depicts a top view of the canine multi-meal kit of FIG. 1, in accordance with an aspect herein.

FIGS. 1-4 provide a canine multi-meal kit 100. The canine multi-meal kit 100 is illustrated in an enclosed configuration in FIGS. 1-3 and is further shown in a lay-flat configuration in FIG. 4. Beginning with FIG. 1, the canine multi-meal kit 100 comprises a first container 102. The first container 102 has a first container volume 104. The first container volume 104 refers to the total volume provided within the first container 102 when the first container 102 is empty. In another aspect, the first container volume 104 may be defined as the total volume enclosed by the first container 102 with a plane extending across flanges (e.g., 112) of the first container. The canine multi-meal kit 100 further comprises a second container 106. The second container 106 has a second container volume 108. The second container volume 108 refers to the total volume provided within the second container 106 when the second container 106 is empty. When the first container 102 and the second container 106 are selectively mated to one another, the first container volume 104 and the second container volume 108 are enclosed, as shown in FIG. 1. Accordingly, when the first container 102 and the second container 106 are selectively mated to enclose the first container volume 104 and the second container volume 108, the canine multi-meal kit 100 is in an enclosed configuration. FIG. 2 provides a top view of the canine multi-meal kit 100 wherein the first container 102 and the second container 106 are selectively mated to one another.

The first container 102 comprises a resilient material. In some aspects, the resilient material is formed from a polymeric composition. Examples of polymeric compositions include polycarbonate, polypropylene (PP), polydicyclopentadiene (pDCPD), high density polyethylene (HDPE), and/or a combination thereof. The resilient material resists or prevents moisture penetration of the first container 102. The first container 102 may comprise or be constructed from one or more materials, such as, for example, polyurethane (TPU), high density polyethylene (HDPE), low density polyethylene (LDPE), linear low density polyethylene (LLDPE), polyethylene terephthalate (PET or PETE), polystyrene, polyvinyl chloride (PVC, vinyl), polycarbonate, and/or bioplastic polylactide (PLA). The second container 106 may comprise the same or similar material(s) discussed above to achieve the same or similar properties as found in the first container 102. Alternatively, the second container 106 may comprise one or more different material(s) than the first container 102. The resilient material may structurally withstand impact forces resulting, for example, from an airdrop. The resilient material may absorb compressive forces. The resilient material may exhibit a structural property of flexing when force is applied and regaining an original shape and size when the force is removed. Additionally, the resilient material may remain structurally sound (e.g., non-brittle, consistent shape, sufficient resilience) even when exposed to extreme temperatures, from approximately −60 degrees Fahrenheit (approximately −51 degrees Celsius) to approximately 120 degrees Fahrenheit (approximately 48 degrees Celsius).

Figure 3:
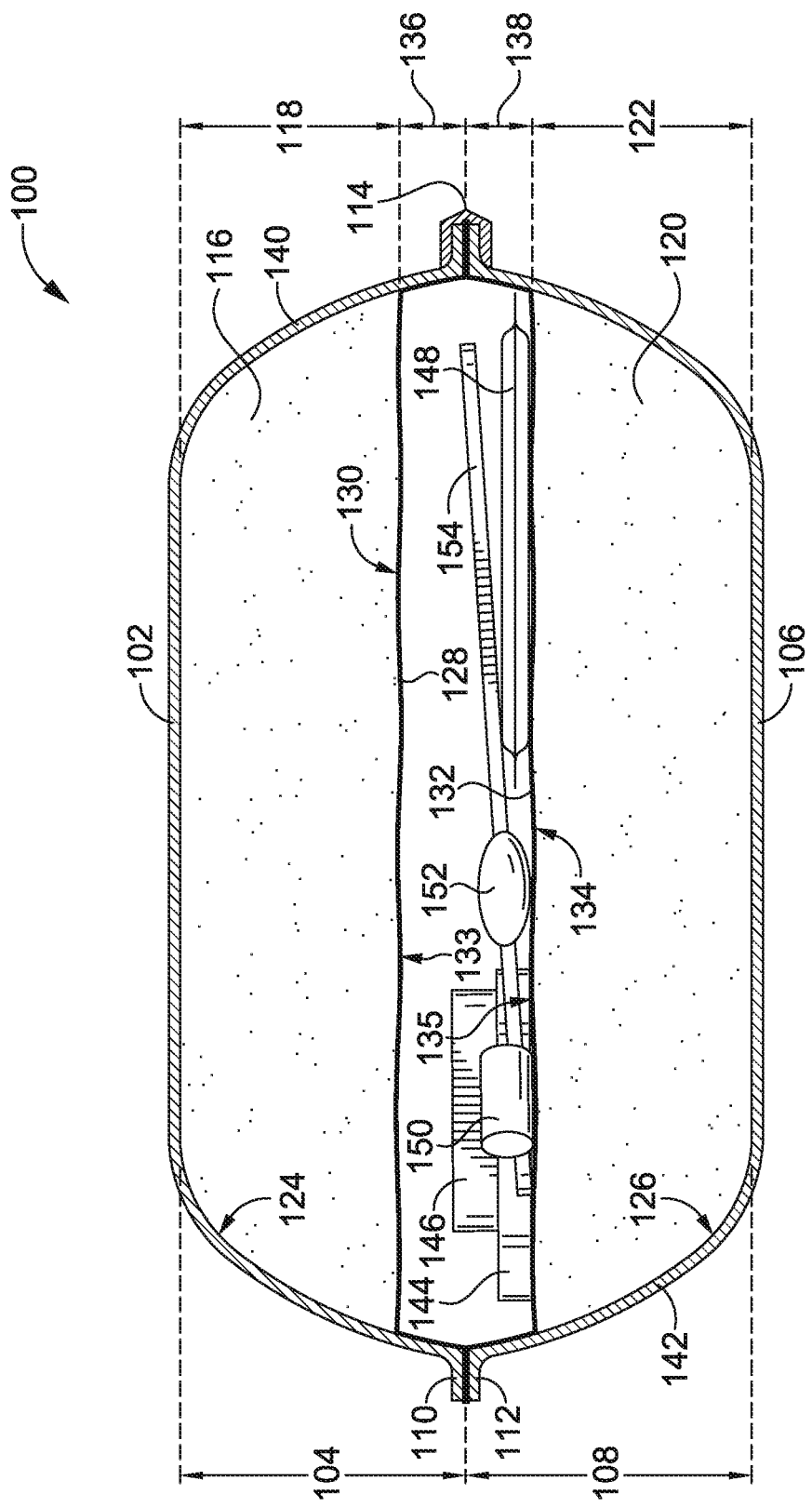
FIG. 3 depicts a cross-section of the canine multi-meal kit of FIG. 1 in accordance with an aspect herein.

Turning to the cross-section of the canine multi-meal kit 100 presented in FIG. 3, the first container 102 comprises a first flange 110. In one aspect, the first flange 110 forms a continuous rim that extends around the entirety of the first container 102. When the first container 102 and the second container 106 are selectively mated to one another, the first flange 110 of the first container 102 is configured to engage or otherwise mate with a portion of the second container 106. In FIG. 3, the second container 106 comprises a second flange 112. In one aspect, the second flange 112 forms a continuous rim that extends around the entirety of the second container 106. In one such aspect, the first flange 110 of the first container 102 is configured to engage or mate with the second flange 112 of the second container 106. The first flange 110 and the second flange 112 may engage one another using contact-based friction, for example. In another example, the first flange 110 and the second flange 112 may have complementary structures that mechanically mate with one another (not shown). It is contemplated that one or more materials may be disposed between the respective flanges when in a mated, enclosed configuration. The one or more materials include, but are not limited to, adhesive, mechanical bonding materials, sealants, gaskets, containment structure, and the like.

In some aspects, the first container 102 and the second container 106 may be the same in size, shape, color, and/or dimension(s), in aspects. The first container 102 and the second container 106 may further be constructed of the same or similar materials and may be constructed to have the same or similar material thickness. In one aspect, the first container 102 and the second container 106 are identical in size and shape, for example. In other aspects, the first container 102 and the second container 106 are different in size, shape, color, and/or dimension(s). In such aspects, the canine multi-meal kit 100 exhibit may not have an enclosed configuration. The first container 102 and the second container 106 may further be constructed of different materials and/or may be constructed to have a different material thickness in various aspects. As such, the first container 102 and the second container 106 may be any size or shape. Examples of shapes include a circle, oval, square, hexagon, and/or octagon, such that the shapes provided in FIGS. 1-8 are merely illustrative examples and are not limiting. As used herein, it will be understood that the containers are three-dimensional, albeit they may be described herein for simplicity using two-dimensional shapes (i.e., a circle versus a half-sphere).

In some aspects, the canine multi-meal kit 100 includes a bridge portion 114. The bridge portion 114 may be a strip of material, in some aspects. The thinness of the flattened strip may provide the bridge portion 114 with flexibility. Additionally or alternatively, the bridge portion 114 comprises a flexible material. In some aspects, the flexible material is formed from a polymeric composition. Examples of compositions include polythene, polysiloxanes, or a combination therefore. In one aspect, the bridge portion 114 is coupled to the first container 102 and the second container 106. The bridge portion 114 may stabilize the canine multi-meal kit 100 in the enclosed configuration as the bridge portion 114 acts to link the first container 102 and the second container 106 to one another. In further aspects, the bridge portion 114 is coupled to the first flange 110 of the first container 102 and the second flange 112 of the second container 106. In some aspects, the bridge portion 114 includes one or more perforations or indentations. The perforations or indentations weaken the material of the bridge portion such that bridge portion 114 may be torn, for example. When the bridge portion 114 is torn into two or more portions, the first container 102 and the second container 106 may no longer be connected or linked together, and may be moved independent from one another. For example, by untethering the first container 102 and the second container 106 from one another, one of the containers may be used to serve a ration to a canine while the other container and ration are kept away from the canine, thus preventing a hungry canine from attempting to devour both rations at once. In an alternative aspect, the canine multi-meal kit 100 lacks a bridge portion 114.

Continuing, the canine multi-meal kit 100 further comprises a first dry food ration 116 of a first dry food ration volume 118 and a second dry food ration 120 of a second dry food ration volume 122. The first dry food ration 116 is stowed in the first container 102 whereas the second dry food ration 120 is stowed in the second container 106. In aspects, the first dry food ration 116 corresponds to one meal suited for a canine and the second dry food ration 120 corresponds to one meal suited for a canine. Generally, the first container 102 has an interior surface 124, and the first dry food ration 116 contacts the interior surface 124. In a similar manner, the second container 106 has an interior surface 126, and the second dry food ration 120 contacts the interior surface 126. In contrast to the canine multi-meal kit 100 presented in FIGS. 1-4, in a scenario where a food ration is sealed in an additional bag or pouch and is then placed in a container, the food rations would not be in direct contact with the container. In such a scenario, the additional bag or pouch would increase both the weight and waste associated with a kit. To avoid these undesirable elements, the container and containment structures of canine multi-meal kit 100 are formed from one or more resilient materials that is/are moisture impervious.

The first dry food ration volume 118 refers to a total volume occupied by the first dry food ration 116 in the first container 102. Similarly, the second dry food ration volume 122 refers to a total volume occupied by the second dry food ration 120 in the second container 106. In aspects, the first dry food ration volume 118 is less than the first container volume 104. In further aspects, the second dry food ration volume 122 is less than the second container volume 108.

The first dry food ration 116 is a dehydrated food ration suited for consumption by a canine. In one aspect, the first dry food ration 116 is freeze-dried to remove at least 90% of the original moisture content of the pre-treated food ration (i.e., prior to dehydration). In another aspect, the first dry food ration 116 is dehydrated using heat and/or air circulation drying techniques to remove at least 80% of the original moisture content of the pre-treated food ration. Dehydration of the first dry food ration 116 reduces the weight of the food ration and reduces the overall weight of the canine multi-meal kit 100. Dehydration of the first dry food ration 116 further increases the shelf life of the dry food rations. Additionally or alternatively, the second dry food ration 120 is a dehydrated food ration suited for consumption by a canine. The second dry food ration 120 may be dehydrated using the techniques discussed above to achieve the same or similar reductions in original moisture content of the pre-treated food ration. It is noted that the hydration levels for optimal canine health are notably different from the hydration levels that are optimal for human health. As such, more or less water or other liquid may be subsequently added to a dehydrated ration when feeding a canine in order to optimize canine health, considering atmospheric conditions (e.g., arid climate) and/or to address gastrointestinal distress. As mentioned above, the volume of a food ration is less than the volume of a corresponding container, and thus, a volume remains in the container so that liquid(s) may be added to the food ration in the container without the food and/or liquid(s) spilling out of the containers.

Although the canine multi-meal kit 100 shown in FIGS. 1-4 comprises first and second dry food rations 116 and 120, it is contemplated and with the scope of this disclosure that additional meals may be included in further aspects. In aspects, each ration corresponds to one full meal suited for a canine. In further aspects, the rations of the canine multi-meal kit 100 meet the caloric and nutritional needs of a canine for one 24 hour period of time. In another aspect, the canine multi-meal kit 100 includes at least three dry food rations that meet the caloric and nutritional needs of a canine for one 24 hour period of time.

In further aspects, the first and second dry food rations 116 and 120 together comprise a food product having a range of approximately 2,000 to 3,000 calories. In one aspect, the first and second dry food rations 116 and 120 together comprise a food product having at least 3,000 calories. The food product may comprise a composition having animal matter, plant matter, or a combination thereof. Additionally or alternatively, the first and second dry food rations 116 and 120 together comprise a food product having approximately 50 to 150 grams of protein, measured prior to dehydration. In another aspect, the first and second dry food rations 116 and 120 together comprise a food product having approximately 10 to 50 grams of protein, measured prior to dehydration. In a further aspect, the first dry food ration and the second dry food ration, together, comprise approximately 3,000 calories and 10 to 50 grams of protein. Generally, the rations corresponding to consumption for one 24 hour period comprise at least one gram of protein per one pound of anticipated canine body weight (i.e., a 1:1 ratio). In a further aspect, the rations for one 24 hour period comprise at least two grams of protein per one pound of anticipated canine body weight (i.e., a 2:1 ratio). In some aspects, the first and second dry food rations 116 and 120 together comprise approximately 5 to 200 grams of plant matter. In some aspects, the first and second dry food rations 116 and 120 together comprise approximately 5 to 200 grams of carbohydrates. In various aspects, the calories and macro nutrients of the first dry food ration 116 are different than the second dry food ration 120. In various aspects, the flavor profile (e.g., chicken, beef, and turkey) of the first dry food ration 116 is different than the second dry food ration 120. Variance between the rations may be beneficial to the demeanor of a canine.

Turning again to FIG. 3, the canine multi-meal kit 100 comprises a first containment structure 128 disposed in the first container 102. The first containment structure 128 has an interior surface 130 and an exterior surface 133 opposing the interior surface 130. When in the enclosed configuration, the first containment structure 128 is enclosed and protected by the first container 102 and the second container 106. The first containment structure 128 comprises a non-permeable material. The non-permeable material is formed from a polymeric composition, in some aspects. Examples of polymeric compositions comprise polypropylene, polypropene, polycarbonate, polyvinyl chloride, polyethene, polyester, polyvinylidene chloride, or a combination thereof. As used herein, "non-permeable" refers to a material property that includes a resistance to moisture penetration and which reduces or inhibits gas exchange through the material. Accordingly, the material is a barrier that limits water and gas exchange, for example. The material prevents moisture and/or water from infiltrating and spoiling the first and second dry food rations, for example.

The first containment structure 128 selectively forms an air-tight volume for maintaining the first dry food ration 116 in the first container 102, for example, such that first dry food ration 116 contacts the first container 102 and the first containment structure 128. As used herein, "air tight" refers to impeding gas transfer, however it may be less than a complete exclusion of gas transfer. The first containment structure 128 may be attached to an interior surface 124 of the first container 102 when selectively forming the air-tight volume. In one such aspect, the first dry food ration 116 contacts the interior surface 124 of the first container 102 and the interior surface 130 of first containment structure 128. In another aspect, when selectively forming the air-tight volume of the first container 102, the first containment structure 128 may be attached to at least a portion of the interior surface 130 and the first flange 110 when forming the air-tight volume of the first container 102. Generally, the first containment structure 128 partitions the first container volume 104 into the air-tight volume occupied by the first dry food ration volume 118 and a first unoccupied volume (e.g., remaining volume 136) of the first container volume 104 that is not occupied by the first dry food ration volume 118. In one example, the first containment structure 128 compressively fits within the first container 102 for maintaining the selectively formed air-tight volume. In another example, the first containment structure 128 is secured under tension to the first container 102 when selectively forming the air-tight volume. The interior surface 130 of the first containment structure 128 defines the air-tight volume of the first container 102, and the exterior surface 133 of the first containment structure 128 defines the first unoccupied volume (e.g., remaining volume 136) of the first container volume 104.

Similarly, the canine multi-meal kit 100 comprises a second containment structure 132 disposed in the second container 106. The second containment structure 132 comprises a non-permeable material formed from a polymeric composition, in some aspects. Examples of polymeric compositions comprise polypropylene, polypropene, polycarbonate, polyvinyl chloride, polyethene, polyester, polyvinylidene chloride, or a combination thereof, as previously described. The second containment structure 132 has an interior surface 134 and an exterior surface 135 opposing the interior surface 134. When in the enclosed configuration, the second containment structure 132 is enclosed and protected by the first container 102 and the second container 106. The second containment structure 132 selectively forms an air-tight volume for maintaining the second dry food ration 120 in the second container 106, for example, such that second dry food ration 120 contacts the second container 106 and the second containment structure 132. The second containment structure 132 may be attached to an interior surface 126 when selectively forming the air-tight volume of the second container 106. In one such aspect, the second dry food ration 120 contacts the interior surface 126 of the second container 106 and the interior surface 134 of the second containment structure 132. In another aspect, when selectively forming the air-tight volume of the second container 106, the second containment structure 132 may be attached to at least a portion of the interior surface 126 and the second flange 112 of the second container 106. Generally, the second containment structure 132 partitions the second container volume 108 into the air-tight volume occupied by the second dry food ration volume 122 and a second unoccupied volume (e.g., remaining volume 138) of the second container volume 108 that is not occupied by the second dry food ration volume 122. In one example, the second containment structure 132 compressively fits within the second container 106 for maintaining the selectively formed air-tight volume. In another example, the second containment structure 132 is secured under tension to the second container 106 when selectively forming the air-tight volume. The interior surface 134 of the second containment structure 132 defines the air-tight volume of the second container 106, and the exterior surface 135 of the second containment structure 132 defines the second unoccupied volume (e.g., remaining volume 138) of the second container volume 108.

In one aspect, the first unoccupied volume (e.g., remaining volume 136) of the first container volume 104 is larger than the air-tight volume (e.g., at least the first dry food ration volume 118) of the first container volume 104, and the second unoccupied volume (e.g., remaining volume 138) of the second container volume 108 is larger than the air-tight volume (e.g., at least the second dry food ration volume 122) of the second container volume. In another aspect, the first unoccupied volume (e.g., remaining volume 136) of the first container volume 104 is less than the air-tight volume (e.g., at least the first dry food ration volume 118) of the first container volume 104, and the second unoccupied volume (e.g., remaining volume 138) of the second container volume 108 is less than the air-tight volume (e.g., at least the second dry food ration volume 122) of the second container volume.

In FIG. 3, the first and second dry food rations 116 and 120 are vacuum-sealed within the first container 102 and the second container 106, respectively, by the first containment structure 128 and the second containment structure 132. When a vacuum seal is created, gas is removed from within a container; however it may be less than a complete exclusion of gas. As shown in the example of FIG. 3, removing gas from the first container 102 results in the interior surface 130 of the first containment structure 128 contacting the first dry food ration 116. For example, the first containment structure 128 selectively forms an air-tight volume for maintaining the first dry food ration 116 in the first container 102. In one such embodiment, when the air-tight seal is a vacuum-type seal, the first dry food ration 116 secured under tension to the first container 102 due to the lack of air volume, and the first dry food ration 116 contacts the first container 102 and the first containment structure 128. In aspects where the interior surface 130 of the first containment structure 128 clings to the first dry food ration 116 due to gas removal, the air-tight volume corresponds to the first dry food ration volume 118. Accordingly, the first dry food ration 116 is under compression between the first container 102 and the first containment structure 128 when the first containment structure 128 is selectively forming the air-tight volume.

In another example, the second containment structure 132 selectively forms an air-tight volume for maintaining the second dry food ration 120 in the second container 106, wherein when the air-tight seal is a vacuum seal, the second dry food ration 120 contacts the second container 106 and the second containment structure 132, and the second dry food ration 120 secured under tension to the second container 106. In aspects where the interior surface 134 of the second containment structure 132 clings to the second dry food ration 120 due to gas removal, the air-tight volume corresponds to the second dry food ration volume 122. Accordingly, the second dry food ration 120 is under compression between the second container 106 and the second containment structure 132 when the second containment structure 132 is selectively forming the air-tight volume.

As mentioned above, the first dry food ration volume 118 is less than the first container volume 104, in aspects. In further aspects, the first dry food ration volume 118 combined with a volume occupied by the first containment structure 128 is less than the first container volume 104. The difference between the first container volume 104 and the combination of first dry food ration volume 118 with a volume occupied by the first containment structure 128 results in a remaining volume 136 of the first container volume 104. In a similar manner, the second dry food ration volume 122 is less than the second container volume 108, in aspects. In further aspects, the second dry food ration volume 122 combined with a volume occupied by the second containment structure 132 is less than the second container volume 108. The difference between the second container volume 108 and the combination of second dry food ration volume 122 and with a volume occupied by the second containment structure 132 results in a remaining volume 138 of the second container volume 108. The remaining volumes 136 or 138 of the first container volume 104 and/or the second container volume 108 is a volume that is unoccupied by dry food rations, and further, that is enclosed by containment structures and a sidewall 140 of the first container volume 104 and/or a sidewall 142 of the second container volume 108, when the canine multi-meal kit 100 is in an enclosed configuration. As shown in the brackets of the cross-section of FIG. 3, the remaining volume 136 of the first container volume 104 may be visualized using the interior surface 124 of the sidewall 140 of the first container 102, from the first flange 110 to the first containment structure 128. Similarly, the remaining volume 138 of the second container volume 108 may be measured along the interior surface 126 of the sidewall 142 of the second container 106, from the second flange 112 to the second containment structure 132, for example, as shown by brackets in FIG. 3.

Figure 4:
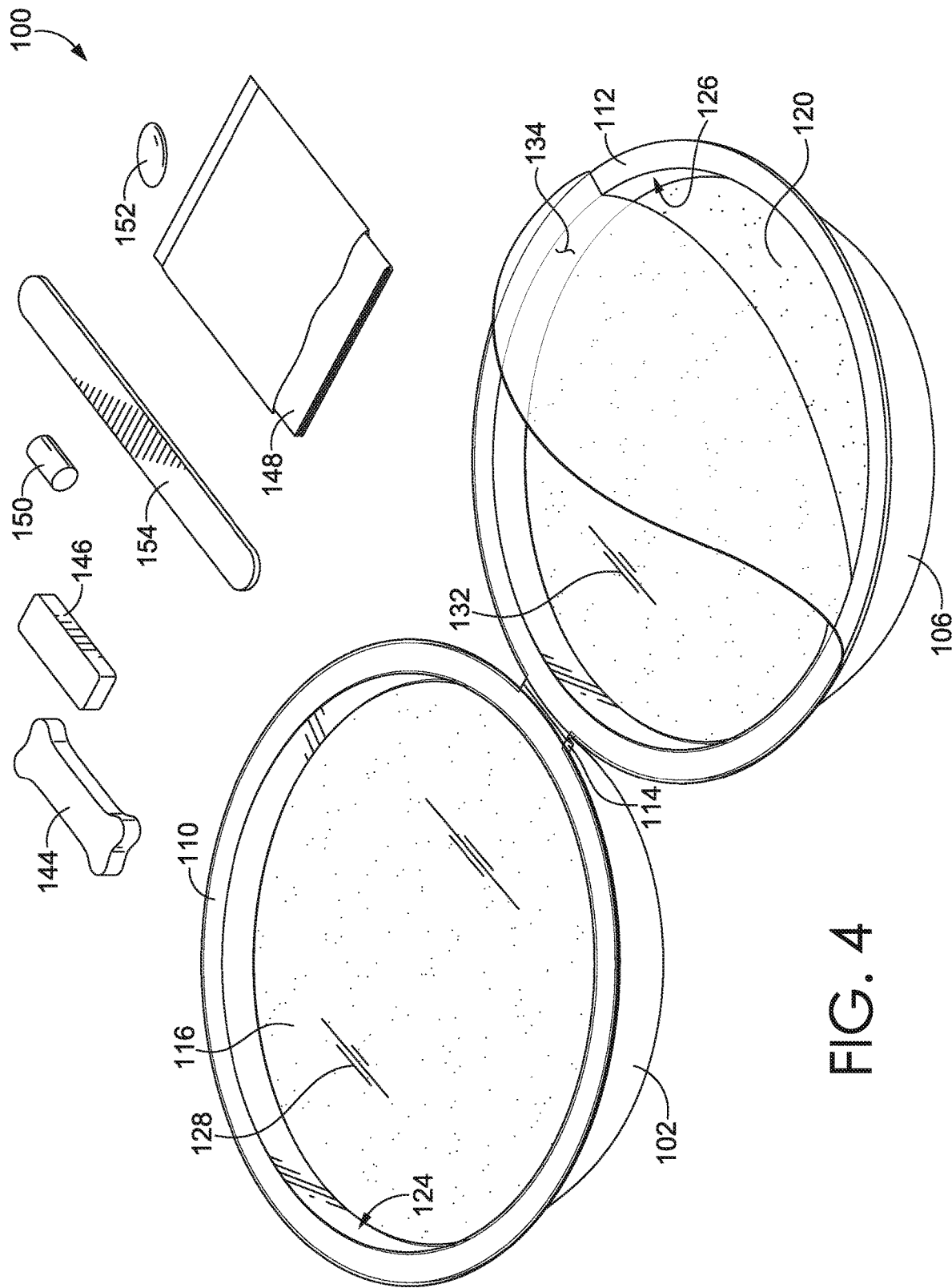
FIG. 4 depicts a perspective of the canine multi-meal kit of FIG. 1 in another configuration, in accordance with an aspect herein.

Either alone or in combination, the remaining volume 136 of the first container 102 and the remaining volume 138 of the second container 106 provide additional storage space within the canine multi-meal kit 100. For example, one or more items are stored at least partially within the first unoccupied volume (e.g., remaining volume 136) of the first container volume 104 and the second unoccupied volume (e.g., remaining volume 138) of the second container 106 when in the enclosed configuration. One or more items may be stowed and/or secured within the remaining volume 136 of the first container 102 and the remaining volume 138 of the second container 106, for example. Examples of items are shown in FIG. 4, wherein the canine multi-meal kit is in a lay-flat configuration. In some aspects, the canine multi-meal kit 100 includes additional items. In some aspects, the canine multi-meal kit 100 includes a food product 144 that is suited for use as a canine treat. The food product 144 is different from the first and second dry food rations 116 and 120, for example, as the food product 144 may have relatively fewer calories and/or less protein content. The food product 144 may be structurally porous or non-porous. In one aspect, the food product 144 has a substantially non-porous structure, which reduces breakage of the food product 144 and which produces a chewy bite property. In another aspect, the food product 144 has a porous structure which reduces the chew-life of the food product 144 and provides a soft bite property. In one example, the bite property of the food product 144 is different than the bite property of the first dry food ration 116 and/or the second dry food ration 120. The food product 144 may have an acidic pH. For example, the pH of the food product 144 may be in the range of 5.0 and 3.0. This range of acidity is highly palatable for canines. In further aspects, the food product 144 comprises citric acid, which is highly palatable to canines. Additionally or alternatively, the food product 144 comprises 30-50% by weight of meat or meat by-products, in one example. The food product 144 may have a flavor profile that is different from the flavor profile of the first dry food ration 116 and/or the second dry food ration 120. In one example, the food product 144 may comprise a dried fish-based product (e.g., whole fish skin), which provides a different flavor profile than the first dry food ration 116 and/or the second dry food ration 120. In some aspects, the food product 144 is included with the canine multi-meal kit 100 wherein the food product is one canine treat. In another aspect, each of the first dry food ration 116 and the second dry food ration 120 include the food product 144 that is suited for use as a canine treat. The inclusion of the food product 144 in the canine multi-meal kit 100 ensures that the canine multi-meal kit 100 includes behavioral rewards, which is imperative for continued and consistent performance, for example, of a working canine.

In some aspects, the canine multi-meal kit 100 includes an edible composition 146 that is suited for use as a canine dental cleaning agent. The edible composition 146 may have a substantially non-porous structure. The edible composition 146 may be a solid, as opposed to a liquid. The at least partially non-porous structure creates a "chewy" bite property for the edible composition. In some aspects, the structure of the edible composition 146 that is suited for use as a canine dental cleaning agent is less porous than the structure of the food product 144 such that the edible composition 146 exhibits a greater chewy bite property relative to the food product 144 Additionally, the edible composition 146 that is an at least partially non-porous structure is also resilient to the application of force (e.g., chewing) such that the edible composition 146 is malformed and elastic from the application of force, for example, but the composition may not break into myriad pieces (i.e., may not crumble). In one example, the edible composition 146 is malformed and elastic when force is applied so that the edible composition 146 contacts and adheres to a canine's teeth. In one example, when stress is applied to the edible composition 146 (e.g., chewing), the edible composition 146 becomes elastic and conforms to the surface of the teeth, adheres to residential food grit on the surface of the teeth, un-attaches from the teeth with the residential food grit, and then is swallowed by the canine, thus cleaning the teeth. In aspects, the non-porous and/or solid structure of the edible composition 146 may be extruded or molded into any shape.

Alternatively, the edible composition 146 may be a viscoplastic (e.g., a Bingham plastic that behaves as a rigid body at low stresses but flows as a viscous fluid at high stress) that is resilient to chewing. In one example, the edible composition 146 is stowed in a tube with a nozzle for delivery. Applying pressure to the tube is such that the walls of the tube compress and force the edible composition 146 out of the tube through the nozzle for a controlled delivery. When the edible composition 146 that is viscoplastic is chewed, the edible composition 146 becomes more fluid to adhere to residential food grit on the surface of the teeth, un-attaches from the teeth with the residential food grit, and then is swallowed by the canine, thus cleaning the teeth. The edible composition 146 may have a different flavor profile than the food product, in some aspects. In some aspects, one edible composition is included with the canine multi-meal kit 100. In another aspect, each of the first dry food ration 116 and the second dry food ration 120 include the edible composition 146 that is suited for use as a canine dental cleaning agent. As discussed above, items such as the edible composition 146 are maintained between the first containment structure 128 and the second containment structure 132 when the second container 106 and the first container 102 are selectively mated to one another, such that the canine multi-meal kit 100 is in an enclosed configuration.

The canine multi-meal kit 100 may include a fiber product 148. The fibers of the fiber product 148 may comprise a base material, such wood, cotton, natural fibers, rayon, polyester, other man-made fibers, or a combination thereof. In one aspect, the fiber product 148 comprises a plurality of fibers forming a flat and flexible sheet. The fiber product 148 may comprises fibers that have been knit or woven to form the fiber product 148. In another aspect, fiber product 148 comprises a non-woven configuration of fibers. For example, the fiber product 148 may comprise a network of fibers compressed together into a flat and flexible sheet. In another example, the fiber product 148 is formed by air-laid fibers. The fiber product 148 may have a soft tactile property created by the size of the fibers, the material of the fibers (e.g., cotton), and the process used to form the fiber product 148 from the fibers. In one aspect, the fiber product 148 is a flat and flexible sheet that is approximately ≤160 millimeters wide and ≤160 millimeters in length. In another aspect, the fiber product 148 is a flat and flexible sheet that is approximately ≤100 millimeters wide and ≤160 millimeters in length. Additionally, the fiber product 148 is approximately ≤1 millimeter in thickness. In another aspect, the fiber product is approximately ≤0.75 millimeters in thickness. These dimensions are merely examples, however.

The fiber product 148 may be impregnated with a liquid composition in some aspects. In one example, the liquid composition includes one or more chemical compounds. The chemical compounds may have antiseptic, disinfecting, antimicrobial and/or analgesic properties. Such properties may aid in cleaning cuts or abrasions of a canine and increasing canine comfort. In another example, the chemical compounds have moistening and/or moisturizing properties. For example, the fiber product 148 may be impregnated or saturated with a fish-based oil or an oil comprising a vitamin. Such properties may aid in cleaning and protecting the nose, eyes, ears, and/or paw pads of a canine. Alternatively, the fiber product 148 may be impregnated with one or more powder compositions, the composition having one or more chemical compounds with similar properties as those discussed above. The fiber product 148 may be packaged. In one example, the fiber product 148 is folded flat and contained within a sealed package. Folding the fiber product 148 may reduce or control the volume occupied by the fiber product in the canine multi-meal kit 100. Accordingly, controlling the volume occupied by the fiber product 148 ensures that the volume that remains available for stowing items in the canine multi-meal kit 100 is increased or further, maximized. Alternatively, the fiber product 148 is a flat sheet that is rolled into a cylindrical shape and stored within a sealed package. Rolling the fiber product 148 may also reduce or control the volume occupied by the fiber product 148 in the canine multi-meal kit 100.

Additionally, by storing the fiber product 148 in a sealed package, the fiber product 148 remains clean until the fiber product 148 is extracted from the sealed package for use. Using a sealed package to enclose the fiber product 148 may prevent loss of a powder composition or inhibit evaporative loss of a liquid composition therein. In aspects, the canine multi-meal kit 100 comprises two or more fiber products, wherein each fiber product 148 may be stored in separate sealed packages. In such an example, the fiber products may be different so that one kit provides more than one fiber product. In one aspect, the sealed package has perforations as a tear guide or an indention as a tear guide, wherein a portion of the package may be torn away in order to open the sealed package and access the fiber product 148. Of course, this is just one example of a sealed package for a fiber product 148 and other kinds of sealed packages are contemplated to be within the scope of this disclosure.

The canine multi-meal kit 100 may include a composition 150 comprising a medicament suited for alleviating canine pests. An example of a medicament is a composition having a chemical compound that is toxic to adult pests (e.g., fleas and/or ticks) and inhibit egg and/or larval development of pests. Another example of a medicament comprises an anthelmintic agent. The composition 150 comprising a medicament may be formulated as an at least partially solid edible composition for ingestion and absorption via the digestive system, or as a topically-applied liquid for absorption through the epidermis of the canine.

The canine multi-meal kit 100 may include a composition 152 containing a fat. The composition 152 includes a fat, such as, a fish-based oil, krill oil, coconut oil, flaxseed oil, hemp oil, olive oil, or combination thereof. Generally, a fat that is liquid at room temperature is categorized as an oil. In some aspects, the composition 152 containing a fat comprises two or more fats, or a "blend" of fats. For example, the composition 152 containing a fat may comprise a blend of hill oil and hemp oil. Other fats are contemplated to be within the scope of this disclosure. The composition 152 may include a fat, such as, omega-3 fatty acids, omega-6 fatty acids, or a combination thereof. In another aspect, the composition 152 containing a fat comprises at least a 1:2 ratio of a first fat to a second, different fat. For example, the composition 152 containing a fat may comprise a 1:2 ratio of an omega-3 fatty acid to an omega-6 fatty acid. In one aspect, the composition 152 containing a fat comprises at least a 1:3 ratio of omega-3 fatty acids to omega-6 fatty acids. The composition 152 containing a fat may comprise other components or excipients. For example, the composition 152 containing a fat may further comprise, for example, a gelling agent, a thickening agent, or a stabilizing agent. In an aspect, at least 40% of the composition 152 comprises a fat. In another aspect, at least 80% of the composition 152 comprises a fat. The composition 152 contains a one or more fats and one or more fat-soluble vitamins, in further aspects. Generally, ingesting a fat-soluble vitamin with a fat improves absorption of the one or more fat-soluble vitamins. In some aspects, the composition 152 containing a fat is an ingestible supplement for consumption by a canine. In another aspect, the composition 152 containing a fat is a topical treatment for a canine. The composition 152 containing a fat may be stored in a sealed bulb. For example, a sealed bulb may be a shell, a capsule, or an ampule. In one example, a capsule may be ingested for delivery of the composition 152 containing a fat. In another example, a plastic ampule may be punctured and pressure may be applied to release the composition 152 containing a fat through the puncture point of the ampule. In another aspect, the composition 152 containing a fat may be stored in a sealed tube having a nozzle. In one such example, applying pressure to the tube may force the composition 152 out of the tube through the nozzle for a controlled delivery of the composition 152 containing the fat.

The canine multi-meal kit 100 may include an instrument 154 or tool suited for mixing or stirring liquid into rations. In one aspect, the instrument 154 has one or more flat surfaces suitable for agitating a liquid and/or the rations. Additionally or alternatively, the instrument 154 has one or more surfaces suitable for scraping liquids and/or rations from the interior surface 124 of the first container 102 and the interior surface 126 of the second container 106. In one aspect, the instrument 154 has an edge shaped similarly to the interior surface 124 of the first container 102 and the interior surface 126 of the second container 106 to facilitate scraping of rations and/or liquid(s) from therein. Examples of instruments may have a round and slender elongated body, a flattened and elongated body, and a utensil (e.g., a spoon or a fork). The elongated body of the instrument 154 is configured such that a kit user may grasp a portion of the instrument 154 in one hand, and use another portion of the instrument 154 to stir and mix liquid(s) into dehydrated rations within a corresponding container. As mentioned above, the volume of a food ration is less than the volume of a corresponding container, and thus, a volume remains in the container so that liquid(s) may be added to an unsealed food ration in the container without the food ration and/or liquid(s) spilling out of the containers. The instrument 154 may be used to stir, mix, and/or agitate added liquid(s) into an unsealed food ration in a container while minimizing any spillage of food and/or liquid(s) out of the containers during agitation.

In some embodiments, canine multi-meal kit 100 may include one or more additional structures (not shown), such as a bag or pouch, which may be used to contain and store waste for disposal. For example, one or more structures, such as a bag or pouch, may be sealed into each portion of the canine multi-meal kit 100, wherein the one or more bags are used to contain and store canine waste for disposal. In some embodiments, the additional structures may be biodegradable.

In aspects, the canine multi-meal kit 100 discussed above may weigh approximately 750 grams or less. In another aspect, the canine multi-meal kit 100 may weigh approximately 200 grams or less. In addition to being light weight, the canine multi-meal kit 100 may be buoyant, such that the canine multi-meal kit 100 floats when placed in fresh water and/or salt water (i.e., average density of the canine multi-meal kit 100 is lower than that of the body of water).

Figure 5:
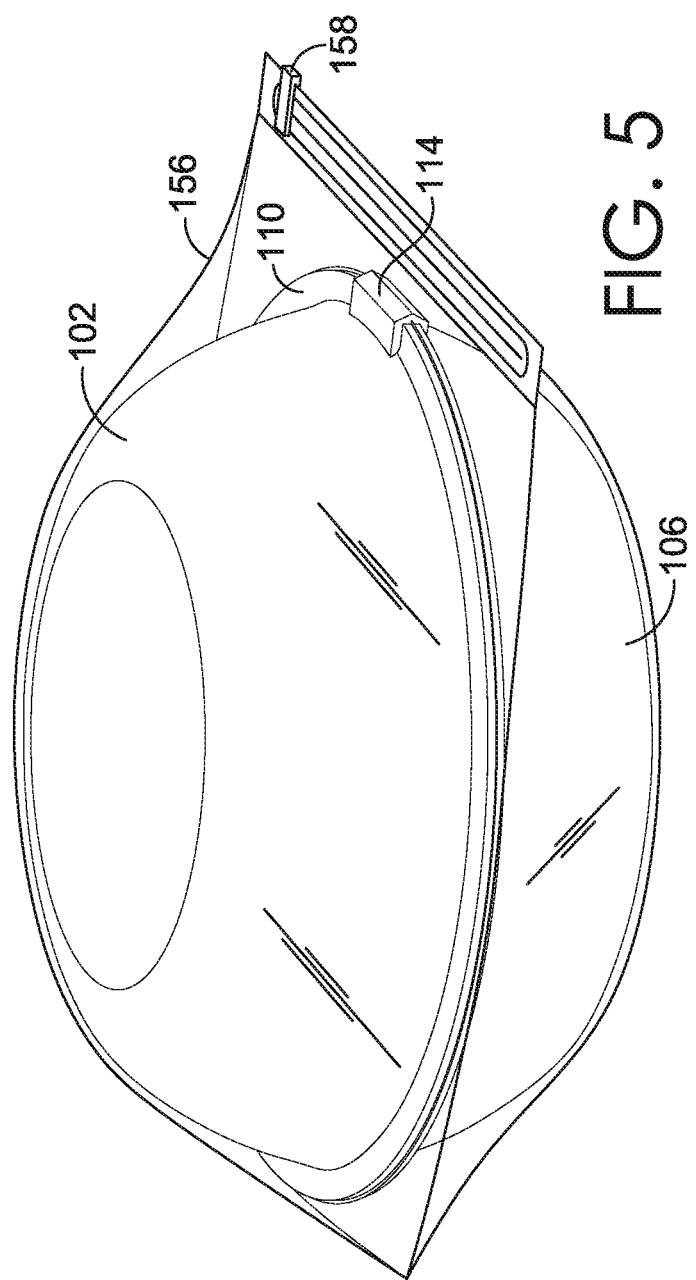
FIG. 5 depicts a perspective view of the canine multi-meal kit of FIG. 1 in an enclosed configuration, in accordance with an aspect herein.

Turning to FIG. 5, the canine multi-meal kit 100 is presented as stowed in a bag 156 having a re-sealable closure 158. The bag 156 may be transparent, semi-transparent, color tinted, or opaque, in various aspects. In aspects, the bag 156 has initially been vacuum sealed, thus providing additional protection (e.g., fail safe) for the rations in the event that the seal of a containment structure is broken or becomes compromised. The re-sealable closure 158 may be used to repeatedly open and close the bag 156 multiple times with fidelity such that the bag 156 may be used and re-used if desired. In further aspects, the bag 156 may be color-coded and/or includes a color marker that identifies the flavor profile of food rations.

Figure 6:
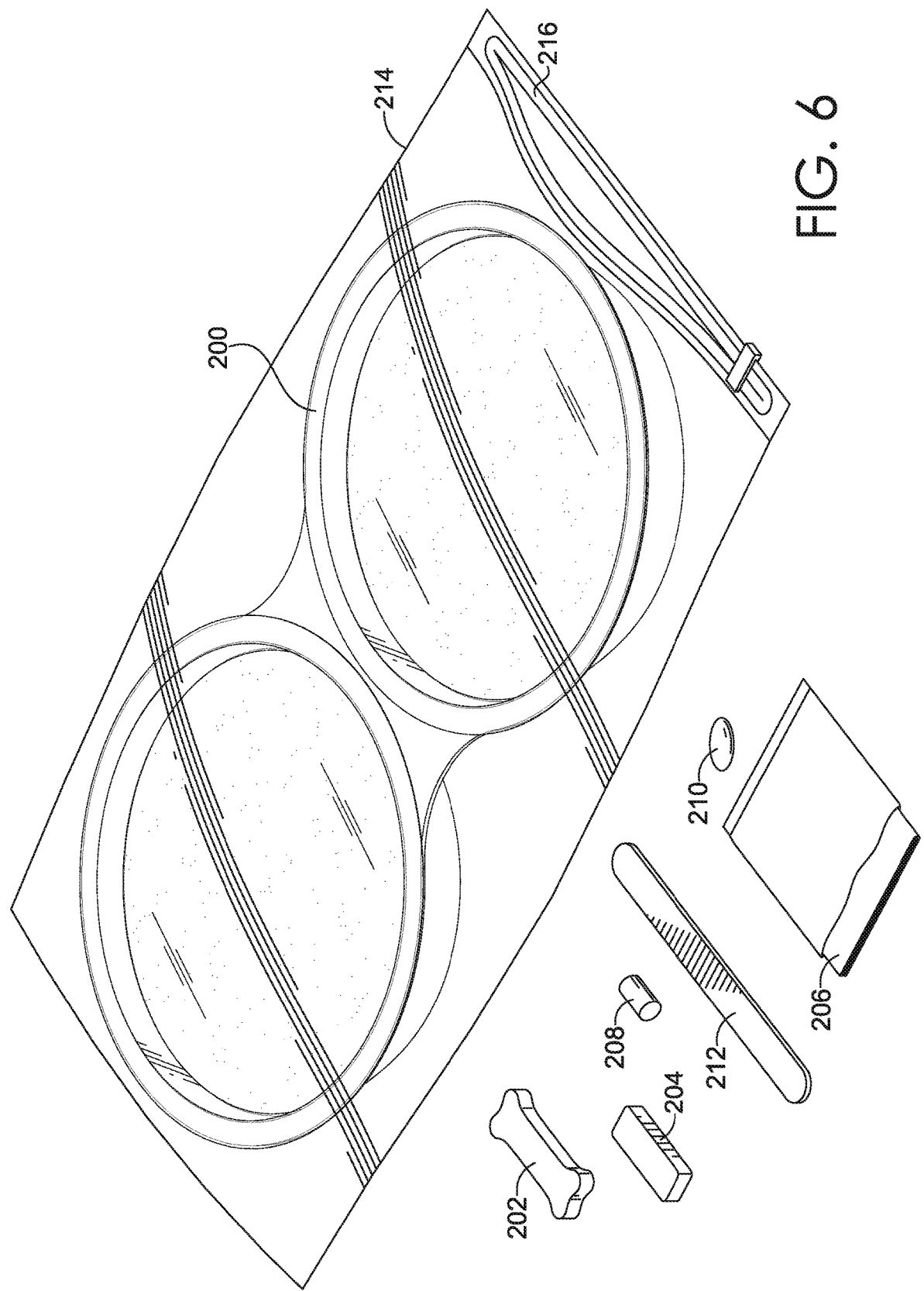
FIG. 6 depicts a perspective view of a canine multi-meal kit, in accordance with an aspect herein.

FIG. 6 provides a canine multi-meal kit 200 that is configured to remain in a lay-flat configuration, as opposed to an enclosed configuration. The canine multi-meal kit 200 includes the features discussed above. In one such aspect, the canine multi-meal kit 200 configured to remain in a lay-flat configuration may be stowed in a re-sealable bag, similar to that described above, with the one or more items discussed above. Examples of items include a food product 202 that is suited for use as a canine treat, an edible composition 204 that is suited for use as a canine dental cleaning agent, a fiber product 206, a composition 208 comprising a medicament, a composition 210 containing a fat, an instrument 212 or tool suited for mixing or stirring liquid into rations, and/or a bag 214 having a re-sealable closure 216. Examples of items, though not shown, may comprise edible compositions including cannabis and/or cannabis-based compounds (e.g., cannabinoids, cannabinol, cannabidiol (CBD)). The canine multi-meal kit 200 configured to remain in a lay-flat configuration may include all of the features and aspects previously described above, however, the canine multi-meal kit 100 lacks an enclosed volume. The canine multi-meal kit 200 configured to remain in a lay-flat configuration has a comparatively low profile to a canine multi-meal kit when in an enclosed configuration.

Figure 7:
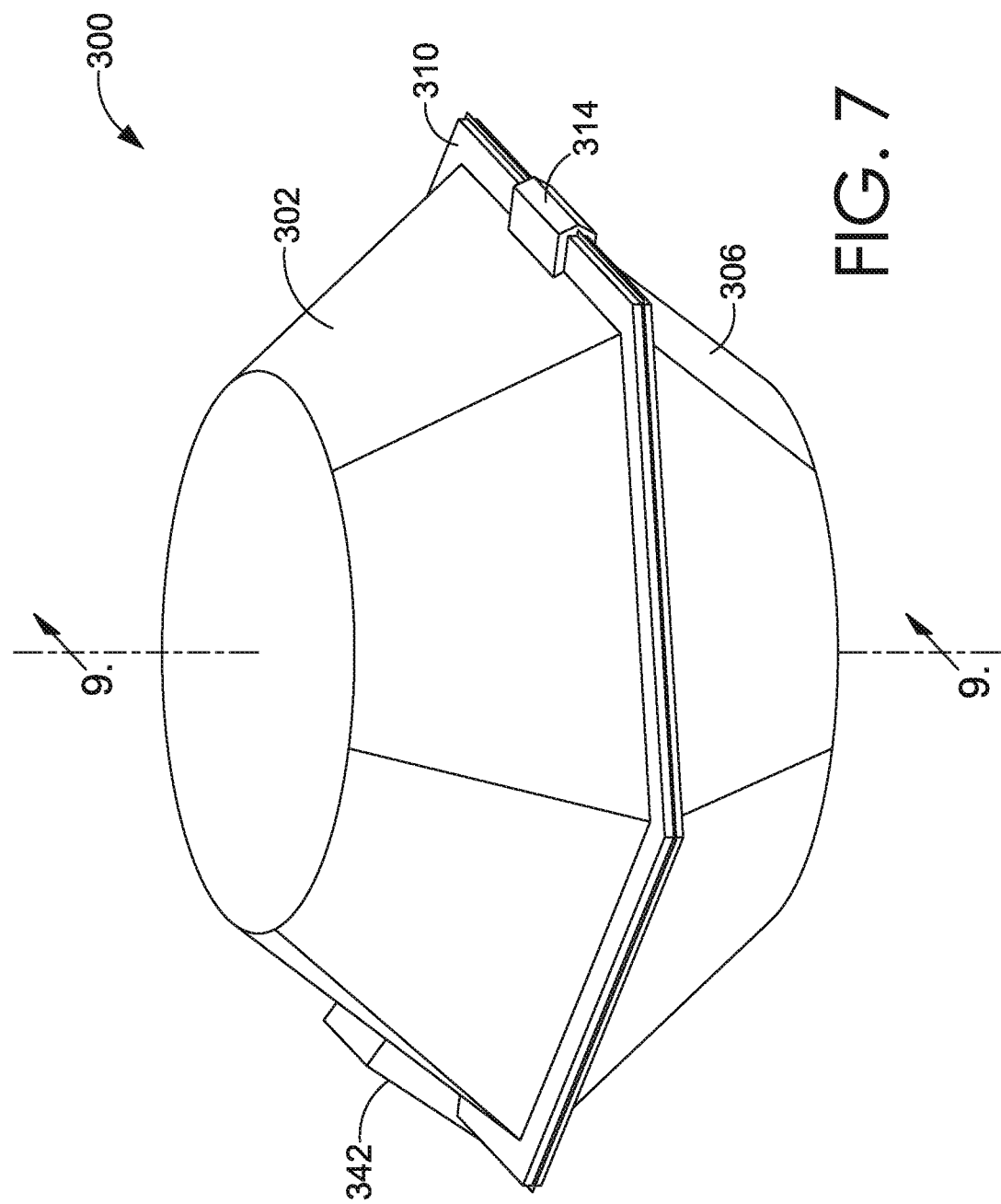
FIG. 7 depicts a perspective view of a canine multi-meal kit in an enclosed configuration, in accordance with an aspect herein.
Figure 8:
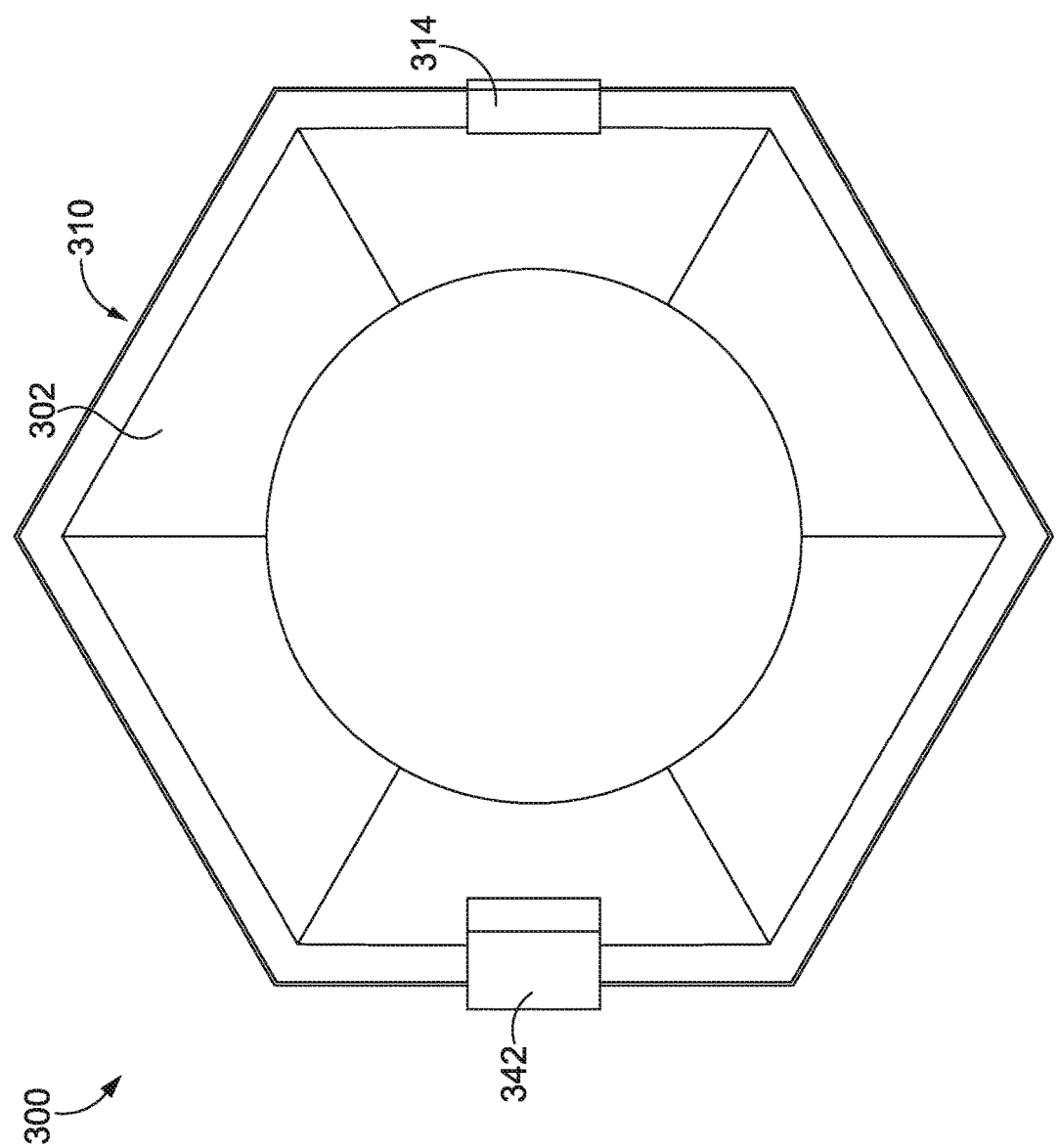
FIG. 8 depicts a top view of the canine multi-meal kit of FIG. 7 in accordance with an aspect herein.

Moving on to FIGS. 7-11, an example canine multi-meal kit 300 is provided. The canine multi-meal kit 100 is illustrated in an enclosed configuration in FIGS. 7-10 and is further shown in a lay-flat configuration in FIG. 11. The canine multi-meal kit 300 shown is similar to that previously described, however the shape of the canine multi-meal kit 300 is different. Beginning with FIG. 7, the canine multi-meal kit 300 comprises a first container 302. The first container 302 has a first container volume 304. The first container volume 304 refers to the total volume provided within the first container 302 when the first container 302 is empty. In another aspect, the first container volume 304 may be defined as the total volume enclosed by the first container 302 with a plane extending across the flanges (e.g., 312) of the first container. The canine multi-meal kit 300 further comprises a second container 306. The second container 306 has a second container volume 308. The second container volume 308 refers to the total volume provided within the second container 306 when the second container 306 is empty. When the first and second containers 302 and 306 are selectively mated to one another, the first container volume 304 and the second container volume 308 are enclosed, as shown in FIG. 7. Accordingly, when the first and second containers 302 and 306 are selectively mated to enclose the first container volume 304 and the second container volume 308, the canine multi-meal kit 300 is in an enclosed configuration. FIG. 8 provides a top view of the canine multi-meal kit 300 wherein the first and second containers 302 and 306 are selectively mated to one another.

The first container 302 comprises a resilient material, as previously described hereinabove. In some aspects, the resilient material is formed from a polymeric composition. Examples of polymeric compositions include polycarbonate, polypropylene (PP), polydicyclopentadiene (pDCPD), high density polyethylene (HDPE), and/or a combination thereof. The resilient material resists or prevents moisture penetration of the first container 302. The second container 306 may comprise the same or similar material(s) discussed above to achieve the same or similar properties as found in the first container 302. Alternatively, the second container 306 may comprise one or more different material(s) than the first container 302. The resilient material may structurally withstand impact forces resulting, for example, from an airdrop. The resilient material may absorb compressive forces. The resilient material may exhibit a structural property of flexing when force is applied and regaining an original shape and size when the force is removed. Additionally, the resilient material may remain structurally sound (e.g., non-brittle, consistent shape, sufficient resilience) even when exposed to extreme temperatures, from approximately −60 degrees Fahrenheit (approximately −51 degrees Celsius) to approximately 120 degrees Fahrenheit (approximately 48 degrees Celsius).

Figure 9:
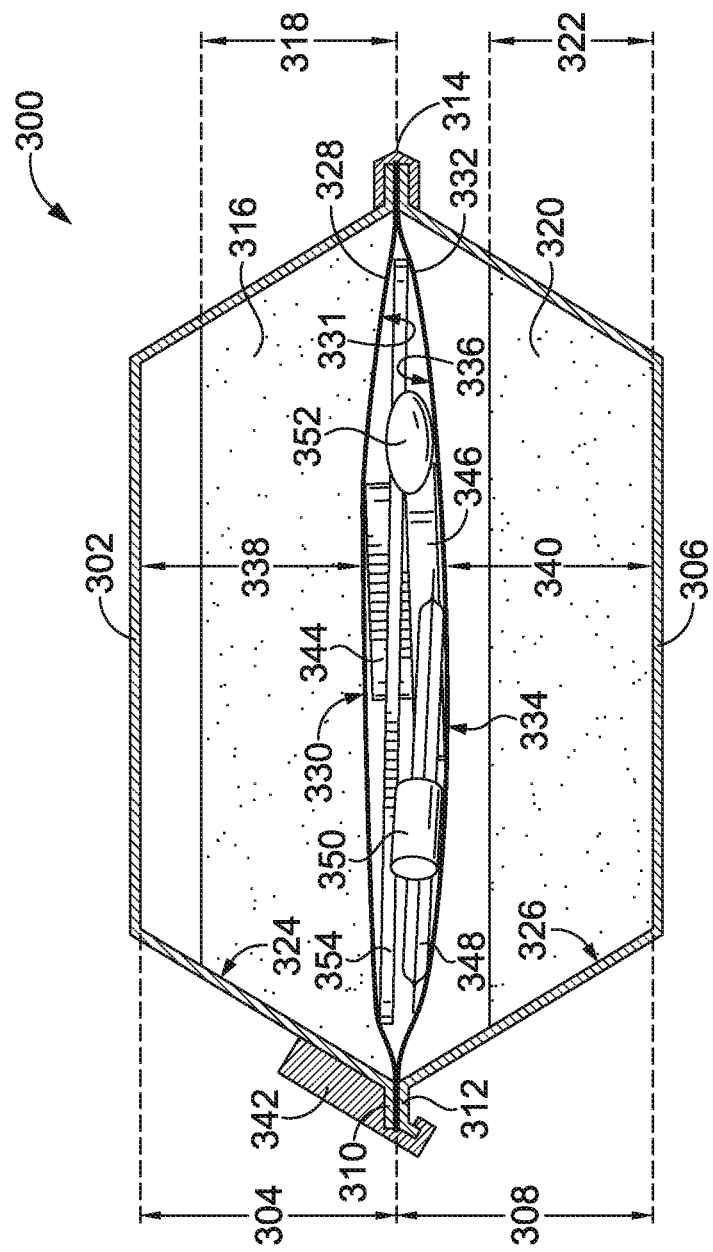
FIG. 9 depicts a cross-section of the canine multi-meal kit of FIG. 7 in accordance with an aspect herein.
Figure 10:
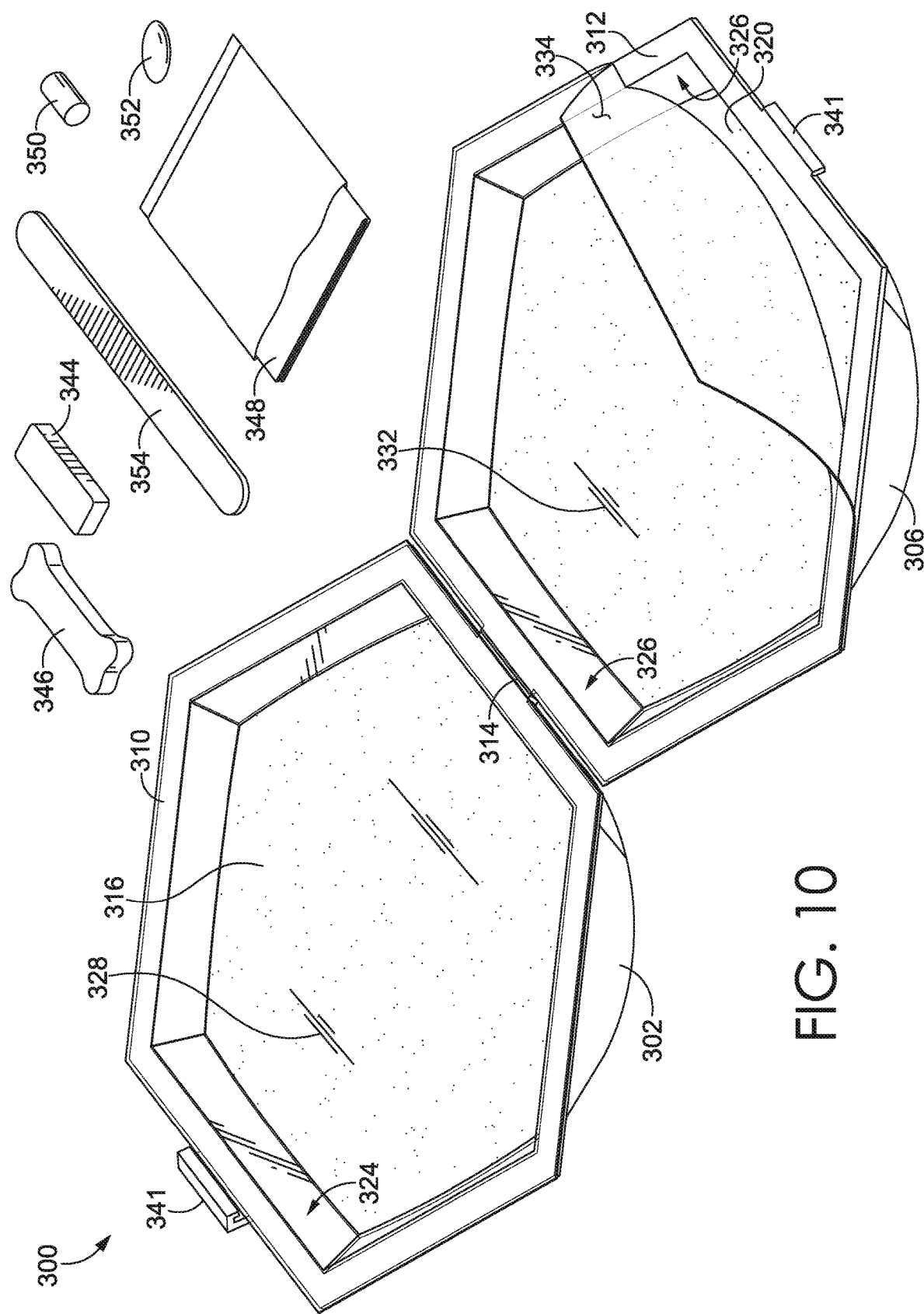
FIG. 10 depicts a perspective of the canine multi-meal kit of FIG. 7 in another configuration, in accordance with an aspect herein.

Turning to the cross-section of the canine multi-meal kit 300 presented in FIG. 9, the first container 302 has a first flange 310. In one aspect, the first flange 310 forms a continuous rim that extends around the entirety of the first container 302. When the first and second containers 302 and 306 are selectively mated to one another, the first flange 310 if the first container 302 is configured to engage or otherwise mate with a portion of the second container 306. In FIG. 9, the second container 306 has a second flange 312. In one aspect, the second flange 312 forms a continuous rim that extends around the entirety of the second container 306. In one such aspect, the first flange 310 of the first container 302 is configured to engage or mate with the second flange 312 of the second container 306. The first flange 310 and the second flange 312 may engage one another using contact-based friction, for example. In another example, the first flange 310 and the second flange 312 may have complementary structures that mechanically mate with one another (not shown). It is contemplated that one or more materials may be disposed between the respective flanges when in a mated, enclosed configuration. The one or more materials include, but are not limited to, adhesive, mechanical bonding materials, sealants, gaskets, containment structure, and the like.

In some aspects, the first and second containers 302 and 306 may be the same in size, shape, color, and/or dimension(s), in aspects. The first container 302 and the second container 306 may further be constructed of the same or similar materials and may be constructed to have the same or similar material thickness. In one aspect, the first container 302 and the second container 306 are identical in size and shape, for example. In other aspects, the first and second containers 302 and 306 are different in size, shape, color, and/or dimension(s). In such aspects, the canine multi-meal kit 300 may not have an enclosed configuration. The first and second containers 302 and 306 may further be constructed of different materials and/or may be constructed to have a different material thickness in various aspects. As such, the first container 302 and the second container 306 may be any size or shape. Examples of shapes include a hexagon, square, octagon, or other multi-sided shape such that the shapes provided in FIGS. 7-11 are merely illustrative examples and are not limiting.

In some aspects, the canine multi-meal kit 300 includes a bridge portion 314. The bridge portion 314 may be a strip of material, in some aspects. The thinness of the flattened strip may provide the bridge portion 314 with flexibility. Additionally or alternatively, the bridge portion 314 comprises a flexible material, as previously described hereinabove. In some aspects, the flexible material is formed from a polymeric composition. Examples of compositions include polythene, polysiloxanes, or a combination therefore. In one aspect, the bridge portion 314 is coupled to the first and second containers 302 and 306. In a further aspect, the bridge portion 314 is coupled to the first flange 310 of the first container 302 and the second flange 312 of the second container 306. The bridge portion 314 may stabilize the canine multi-meal kit 300 in the enclosed configuration as the bridge portion 314 links the first and second containers 302 and 306 to one another. In some aspects, the bridge portion 314 includes one or more perforations or indentations. The perforations or indentations weaken the material of the bridge portion such that bridge portion 314 may be torn, for example. When the bridge portion 314 is torn, the first and second containers 302 and 306 are no longer linked and may be moved independent from one another. In an alternative aspect, the canine multi-meal kit 300 lacks a bridge portion 314.

Continuing, the canine multi-meal kit 300 further comprises a first dry food ration 316 of a first dry food ration volume 318 and a second dry food ration 320 of a second dry food ration volume 322. The first dry food ration 316 is stowed in the first container 302 whereas the second dry food ration 320 is stowed in the second container 306. In aspects, the first dry food ration 316 corresponds to one meal suited for a canine and the second dry food ration 320 corresponds to one meal suited for a canine. Generally, the first container 302 has an interior surface 324 and the first dry food ration 316 contacts the interior surface 324. In a similar manner, the second container 306 has an interior surface 326 and the second dry food ration 320 contacts the interior surface 326. In contrast to the canine multi-meal kit 300 presented in FIGS. 7-11, in a scenario where a food ration is sealed in an additional bag or pouch and is then placed in a container, the food rations would not be in direct contact with the container. In such a scenario, the additional bag or pouch would increase both the weight and waste associated with a kit. To avoid these undesirable elements, the container and containment structures of canine multi-meal kit 300 are formed from one or more resilient materials that are moisture impervious.

The first dry food ration volume 318 refers to a total volume occupied by the first dry food ration 316 in the first container 302. Similarly, the second dry food ration volume 322 refers to a total volume occupied by the second dry food ration 320 in the second container 306. In aspects, the first dry food ration volume 318 is less than the first container volume 304. In further aspects, the second dry food ration volume 322 is less than the second container volume 308.

The first dry food ration 316 is a dehydrated food ration suited for consumption by a canine. In one aspect, the first dry food ration 316 is freeze-dried to remove at least 90% of the original moisture content of the pre-treated food ration (i.e., prior to dehydration). In another aspect, the first dry food ration 316 is dehydrated using heat and/or air circulation drying techniques to remove at least 80% of the original moisture content of the pre-treated food ration. Dehydration of the first dry food ration 316 reduces the weight of the food ration and reduces the overall weight of the canine multi-meal kit 300. Dehydration of the first dry food ration 316 further increases the shelf life of the dry food rations. Additionally or alternatively, the second dry food ration 320 is a dehydrated food ration suited for consumption by a canine. The second dry food ration 320 may be dehydrated using the techniques discussed above to achieve the same or similar reductions in original moisture content of the pre-treated food ration. It is noted that the hydration levels for optimal canine health are notably different from the hydration levels that are optimal for human health. As such, more or less water or other liquid may be subsequently added to a dehydrated ration when feeding a canine in order to optimize canine health, considering atmospheric conditions (e.g., arid climate), and/or to address gastrointestinal distress. As mentioned above, the volume of a food ration is less than the volume of a corresponding container, and thus, a volume remains in the container so that liquid(s) may be added to the food ration in the container without the food and/or liquid(s) spilling out of the containers.

Although the canine multi-meal kit 300 show in FIGS. 1-4 comprises a first and second dry food rations 316 and 320, it is contemplated and with the scope of this disclosure that additional meals may be included in further aspects. In aspects, each ration corresponds to one full meal suited for a canine. In further aspects, the rations of the canine multi-meal kit 300 meet the caloric and nutritional needs of a canine for one 24 hour period of time. In another aspect, the canine multi-meal kit 300 includes at least three dry food rations that meet the caloric and nutritional needs of a canine for one 24 hour period of time.

In further aspects, the first and second dry food rations 316 and 320 together comprise a food product having a range of approximately 2,000 to 3,000 calories. In one aspect, the first and second dry food rations 316 and 320 together comprise a food product having at least 3,000 calories. The food product may comprise a composition having animal matter, plant matter, or a combination thereof. Additionally or alternatively, the first and second dry food rations 316 and 320 together comprise a food product having approximately 50 to 150 grams of protein, measured prior to dehydration. In another aspects, the first and second dry food rations 316 and 320 together comprise a food product having approximately 10 to 50 grams of protein, measured prior to dehydration. Generally, the rations corresponding to consumption for one 24 hour period comprise at least one gram of protein per one pound of anticipated canine body weight (i.e., a 1:1 ratio). In a further aspect, the rations for one 24 hour period comprise at least two grams of protein per one pound of anticipated canine body weight (i.e., a 2:1 ratio). In some aspects, the first and second dry food rations 316 and 320 together comprise approximately 5 to 200 grams of plant matter. In some aspects, the first and second dry food rations 316 and 320 together comprise approximately 5 to 200 grams of carbohydrates. In various aspects, the calories and macro nutrients of the first dry food ration 316 is different from the second dry food ration 320. In various aspects, the flavor profile (e.g., chicken, beef, and turkey) of the first dry food ration 316 is different from as the second dry food ration 320. Variance between the rations may be beneficial to the demeanor of a canine.

Turning again to FIG. 3, the canine multi-meal kit 300 comprises a first containment structure 328 disposed in the first container 302. The first containment structure 328 has an interior surface 330 and an exterior surface 331 opposing the interior surface 130. When in the enclosed configuration, the first containment structure 328 is enclosed and protected by the first and second containers 302 and 306. The first containment structure 328 comprises a non-permeable material. The non-permeable material is formed from a polymeric composition, in some aspects. Examples of polymeric compositions comprise polypropylene, polypropene, polycarbonate, polyvinyl chloride, polyethene, polyester, polyvinylidene chloride, or a combination thereof. As used-herein, "non-permeable" refers to a material property that includes a resistance to moisture penetration and which reduces or inhibits gas exchange through the material. Accordingly, the material is a barrier that limits water and gas exchange, for example. The material prevents moisture and/or water from infiltrating and spoiling the first and second dry food rations, for example.

The first containment structure 328 selectively forms an air-tight volume for maintaining the first dry food ration 316 in the first container 302, for example, such that first dry food ration 316 contacts at least a portion of the first container 302 and/or at least a portion the first containment structure 328. The first containment structure 328 may be attached to the first flange 310 of the first container 302 when selectively forming the air-tight volume. In a further aspect, when selectively forming the air-tight volume of the first container 302, the first containment structure 328 may be attached to at least a portion of the interior surface 330. In another aspect, selectively forming the air-tight volume of the first container 302, the first containment structure 328 may be attached to at least a portion of the interior surface 330 and at least portion of the first flange 310 of the first container 302.

Similarly, the canine multi-meal kit 300 comprises a second containment structure 332 disposed in the second container 306. The second containment structure 332 has an interior surface 334 and an exterior surface 336 opposing the interior surface 334. When in the enclosed configuration, the second containment structure 332 is enclosed and protected by the first and second containers 302 and 306. The second containment structure 332 selectively forms an air-tight volume for maintaining the second dry food ration 320 in the second container 306. The second containment structure 332 may be attached to the second flange 312 of the second container 306 when selectively forming the air-tight volume. In a further aspect, when selectively forming the air-tight volume of the second container 306, the second containment structure 332 may be attached to at least a portion of the interior surface 326. In another aspect, selectively forming the air-tight volume of the second container 306, the second containment structure 332 may be attached to at least a portion of the interior surface 326 and at least a portion of the second flange 312 of the second container 306.

In one example, the first containment structure 328 and/or the second containment structure 332 comprise a non-permeable material formed from a polymeric composition comprising one or more of polypropylene, polypropene, polycarbonate, or polyvinyl chloride. In another example, the first containment structure 328 and/or the second containment structure 332 comprise a non-permeable material formed from a polymeric composition comprising one or more of polyethene, polyester, polyvinyl chloride, or polyvinylidene chloride.

In FIG. 9, the first and second dry food rations 316 and 320 are hermetically sealed within the first and second containers 302 and 306, respectively, by the first and second containment structures 328 and 332. As shown, the first containment structure 328 selectively forms an air-tight volume for maintaining the first dry food ration 316 in the first container 302. The second containment structure 332 selectively forms an air-tight volume for maintaining the second dry food ration 320 in the second container 306. When a hermetic seal is created, gas may remain within a container being sealed, in contrast to a vacuum seal (i.e., a vacuum seal being a type of hermetic seal). The cross-section of FIG. 9 illustrates and indicates an example of the air-tight volume 338 of the first container 302 and the air-tight volume of the second container 306.

As shown in FIG. 9, the air-tight volume 338 formed by the first containment structure 328 being attached to the first flange 310 of the first container 302 to selectively form a hermetic seal includes the first dry food ration 316 and a volume of gas. When the air-tight seal is a non-vacuum hermetic seal, the first dry food ration 316 may not be secured under tension to the first container 302 such that, for example, the interior surface 130 of the first containment structure 328 is not forced against or compressed against the first dry food ration 316, due to the presence of gas within the air-tight volume 338, in addition to the first dry food ration volume 318. In that instance, the air-tight volume 338 corresponds to the first dry food ration volume 318 combined with a volume of gas. Accordingly, the first dry food ration 316 may have a degree of freedom of movement and/or shifting within the air-tight volume 338 of the first container 302.

However, in an aspect (not shown), the air-tight volume 338 formed by the first containment structure 328 being attached to the interior surface 324 of the first container 302 to selectively form a hermetical seal includes the first dry food ration 316 and a volume of gas. Yet in that aspect, the first dry food ration 316 has a lesser degree of freedom of movement because the air-tight volume 338 of the first container 302 is reduced in comparison to aspects wherein first containment structure 328 is only attached to the first flange 310. In various aspects, the first dry food ration 316 has some degree of freedom of movement and/or may shift within the air-tight volume 338 of the first container 302 when a non-vacuum, hermetic seal is implemented. The degree of freedom of movement may be controlled by selecting locations of the interior surface 324 of the first container 302 to which the first containment structure 328 is attached in order to reduce the air-tight volume 338. In one such aspect, the air-tight volume 338 is greater than the first dry food ration volume 318 such that the first dry food ration 316 has some freedom of movement or ability to shift within the air-tight volume 338 of first container 102 during transport. As such, the first dry food ration 316 generally contacts at least a portion of the interior surface 324 of the first container 302 and, in some instances of shifting, at least a portion of the interior surface 330 of first containment structure 328.

In a similar manner, the second containment structure 332 selectively forms an air-tight volume for maintaining the second dry food ration 320 in the second container 306, in aspects. When the air-tight seal is a non-vacuum hermetic seal, the second dry food ration 320 secured is not secured under tension to the second container 306, for example. In one such aspect, the interior surface 330 of the second containment structure 332 does not cling to the second dry food ration 320 due to the presence of gas within the air-tight volume 340. In that instance, the air-tight volume 340 corresponds to the second dry food ration volume 322 combined with a volume of gas. Accordingly, as discussed above regarding the first container 302, the degree of freedom of movement of a second dry food ration 320 in the second container 306 may be controlled by selecting locations of the interior surface 326 of the second container 306 to which the second containment structure 332 is attached in order to reduce the air-tight volume 340 of the second container 306, bringing the air-tight volume 340 closer to equal with the second dry food ration volume 322.

As mentioned above, dry food ration volumes are less than container volumes in order to allow a sufficient volume to remain unoccupied by a dry food ration in a container so that liquids may be added to a dry food ration when serving a ration without spilling. Thus, it will be understood from this Description that in some aspects, as an air-tight volume is brought closer to equal with a dry food ration volume by selectively attaching a containment structure to an interior surface of a container, a remaining volume in a container may be exploited for storing one or more items in a kit as previously described. However, FIGS. 7-11 provide an alternative configuration as further discussed below.

As shown in the examples of FIGS. 7-11, the first containment structure 328 is attached to the first flange 310 of the first container 302, and the second containment structure 332 is attached to the second flange 312 of the second container 306. In this aspect, the air-tight volume 338 of the first container 302 comprises a volume of gas combined with the first dry food ration volume 318. As shown in the examples of FIGS. 7-11, the first dry food ration 316 has some degree of freedom of movement within the air-tight volume 338 due to the presence of gas in the air-tight volume 338 as further enabled by attachment of the first containment structure 328 to the first flange 310 of the first container 302. Moreover, the second dry food ration 320 has some degree of freedom of movement within the air-tight volume 338 due to the presence of gas in the air-tight volume 335 as further enabled by attachment of the second containment structure 332 to the second flange 312 of the second container 306. Because of the attachment of the first and second containment structures 328 and 332 to the first flange 310 and the second flange 312, respectively, the first and second containers 302 and 306 of the canine multi-meal kit 100 of FIGS. 7-11 selectively mate to enclose the first container volume 304 and the second container volume 308; however the canine multi-meal kit 300 does not include an enclosed unoccupied volume when in the enclosed configuration.

Instead, one or more items may be stored as compressed between the first and second containment structures 328 and 332 when the canine multi-meal kit 100 is in the enclosed configuration. In particular, the one or more items may be compressed between an exterior surface 331 of the first containment structure 328 and an exterior surface 336 of the second containment structure 332. As shown in FIGS. 7-11, the canine multi-meal kit 100 includes at least one mechanical latching mechanism 342 to secure the canine multi-meal kit 100 in the enclosed configuration when one or more items are stored as compressed between the first and second containment structures 328 and 332. In such an example, the at least one mechanical latching mechanism 342 opposes the force exerted by the one or more items compressed between the first and second containment structures 328 and 332 when the canine multi-meal kit 300 is in an enclosed configuration. The at least one mechanical latching mechanism 342 may secure a portion of the first flange 310 of the first container 302 to a portion of the second flange 312 of the second container 306, for example. In another example, the at least one mechanical latching mechanism 342 may secure a portion of the first container 302 to a portion of the second container 306. The securement of a portion of the first container 302 to a portion of the second container 306 may be achieved through a variety of mechanisms that create a mechanical compression between the first container 302 and the second container 306. In addition to keeping the first container 302 and the second container 306 in a closed state, the compressive force may be translated through the first container 302 and the second container 306 to secure and maintain one or more items stored within and/or between the first container 302 and the second container 306. For example, the compressive force applied by the first and second containment structures 328 and 332 onto one or more items stored there between transport reduces movement and/or shifting of the one or more items, for example, during transport of the canine multi-meal kit 300. Examples of items comprise a food product 344 that is suited for use as a canine treat, an edible composition 346 that is suited for use as a canine dental cleaning agent, a fiber product 348, a composition 350 comprising a medicament, a composition 352 containing a fat, an instrument 354 or tool suited for mixing or stirring liquid into rations, and/or a bag 356 having a re-sealable closure 358, as previously described above. For brevity, each item is not re-discussed here.

Figure 11:
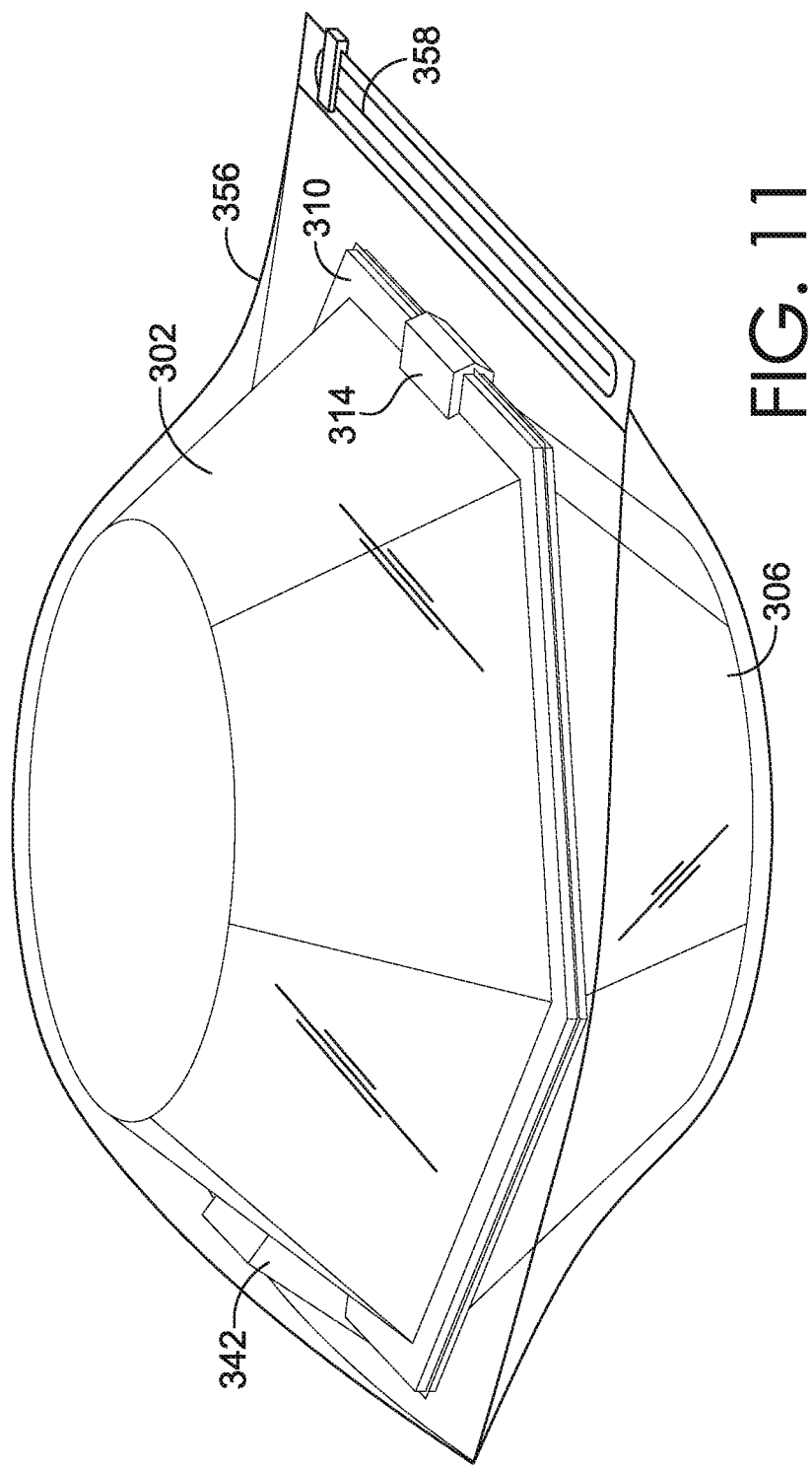
FIG. 11 depicts a perspective view of the canine multi-meal kit of FIG. 7 in an enclosed configuration, in accordance with an aspect herein.

Turning to FIG. 11, canine multi-meal kit 300 is presented as stowed in a bag 356 having a re-sealable closure 358. The bag 356 may be transparent, semi-transparent, color tinted, or opaque, in various aspects. In aspects, the bag 356 has initially been vacuum sealed, thus providing additional protection (e.g., fail safe) for the rations in the event that the seal of a containment structure be compromised. The re-sealable closure 358 may be used to repeatedly open and close the bag 356 multiple times with fidelity such that the bag 356 may be used and re-used if desired. Alternatively, in some embodiments, the bag 356 lacks a re-sealable closure 358. For example, the bag 356 may be vacuum sealed about the canine multi-meal kit 300 and may lack any re-sealable aperture or closure mechanism. In one such example, the bag 356 may be opened by applying force to tear, cut, and/or puncture the bag 356 and to compromise the vacuum seal in order to access the canine multi-meal kit 300. In such embodiments, the bag 356 provides a robust barrier against contamination and spoilage by lacking a re-sealable closure that might compromise the vacuum-seal during transport. In further aspects, the bag 356 may be color-coded and/or includes a color marker that identifies the flavor profile of food rations.

Figure 12:
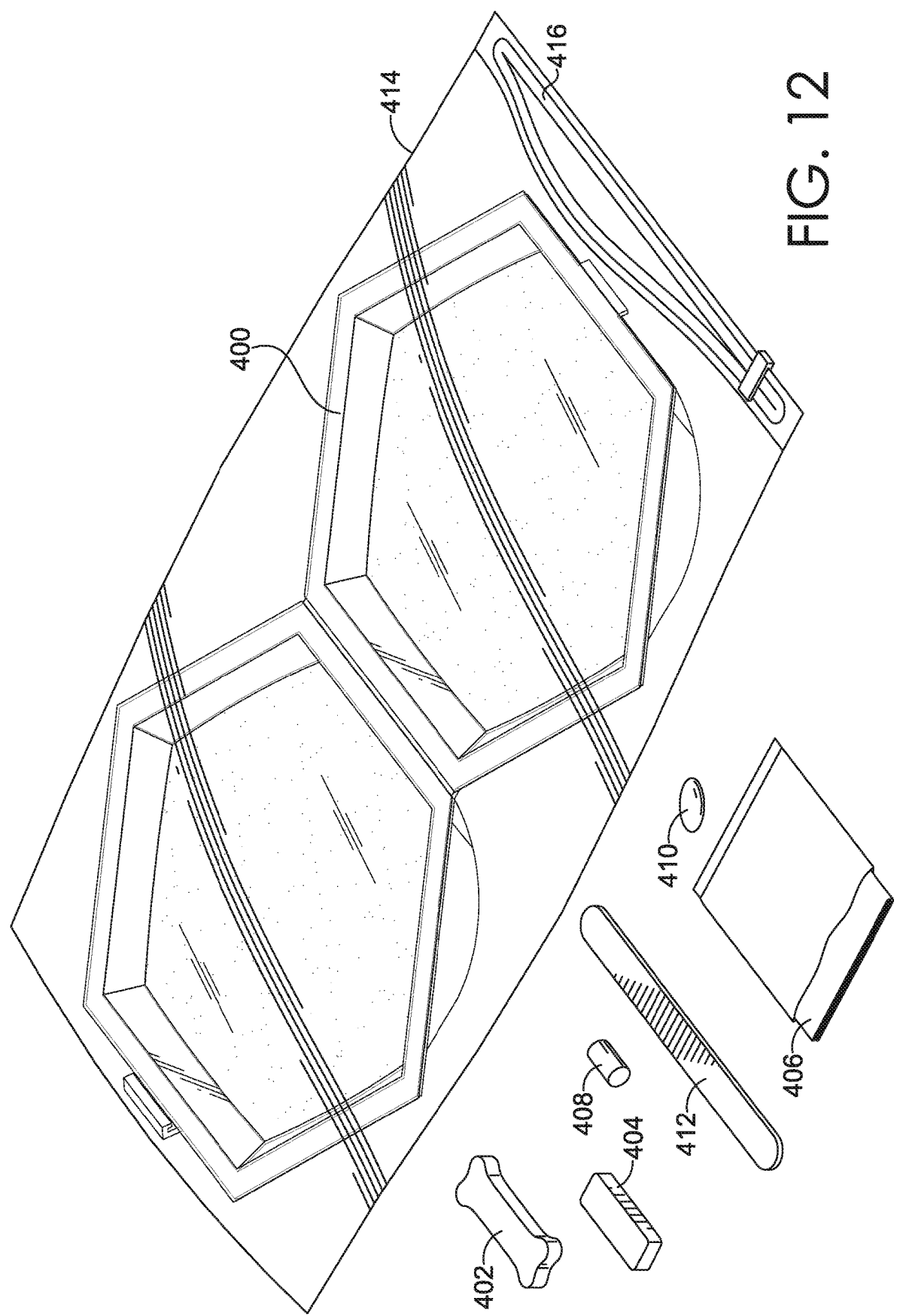
FIG. 12 depicts a perspective view of a canine multi-meal kit, in accordance with an aspect herein.

FIG. 12 provides an alternative aspect wherein a canine multi-meal kit 400 is configured to remain in a lay-flat configuration (i.e., does not have an enclosed configuration). The canine multi-meal kit 400 configured to remain in a lay-flat configuration may include all of the features and aspects previously describe above, however, the canine multi-meal kit 100 lacks an enclosed volume. In one such aspect, the canine multi-meal kit 400 configured to remain in a lay-flat configuration may be stowed in a re-sealable bag, similar to that described above, with the one or more items discussed above. Examples of items include a food product 402 that is suited for use as a canine treat, an edible composition 404 that is suited for use as a canine dental cleaning agent, a fiber product 406, a composition 408 comprising a medicament, a composition 410 containing a fat, an instrument 412 or tool suited for mixing or stirring liquid into rations, and/or a bag 414 having a re-sealable closure 416. The canine multi-meal kit 400 configured to remain in a lay-flat configuration may include all of the features and aspects previously described above, however, the canine multi-meal kit 400 lacks an enclosed volume. The canine multi-meal kit 400 configured to remain in a lay-flat configuration has a comparatively low profile to a canine multi-meal kit when in an enclosed configuration.

Figure 13:
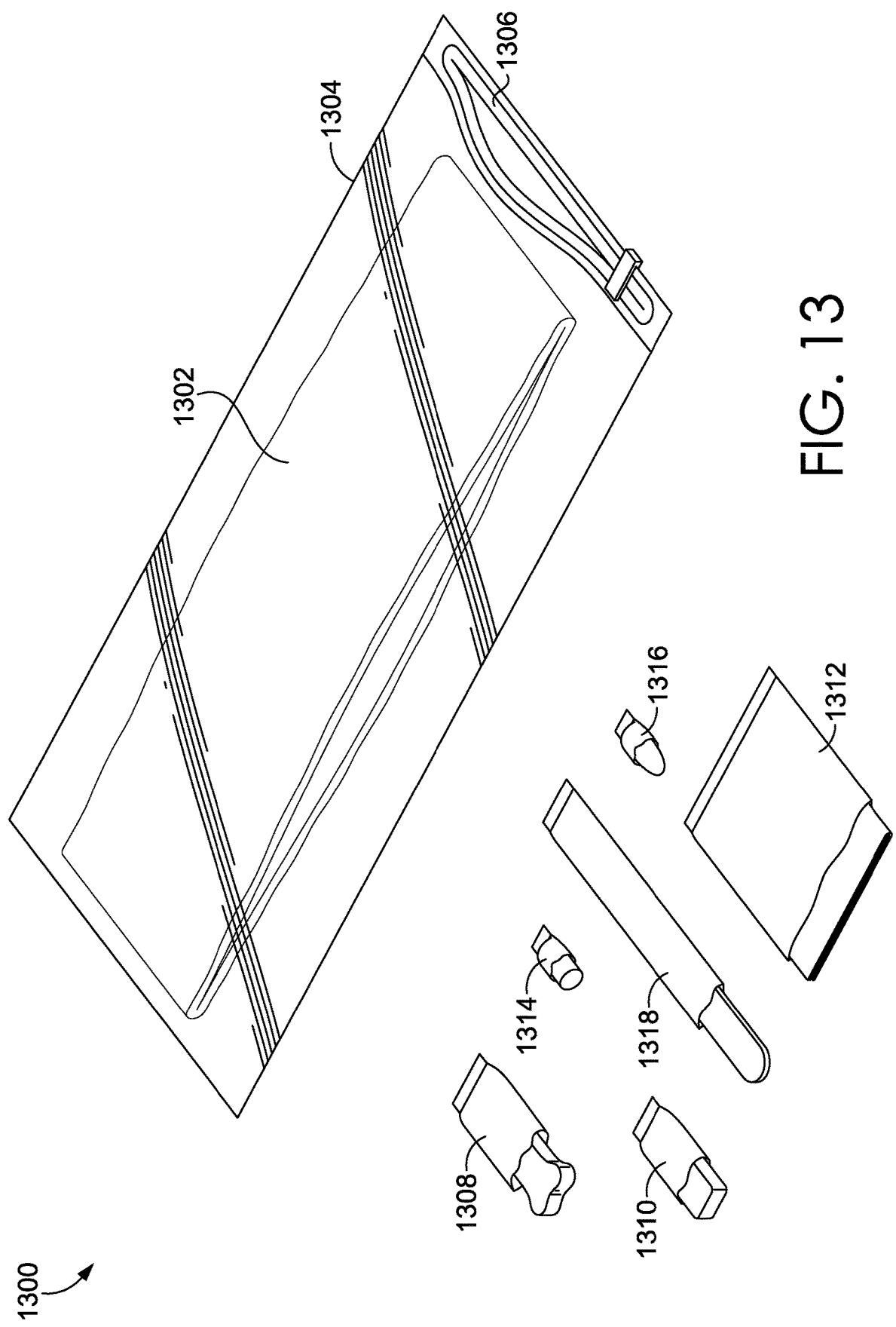
FIG. 13 depicts a perspective view of another canine kit shown in one configuration, in accordance with an aspect herein.

FIGS. 13-15 depict an alternative canine kit 1300. In aspects, the alternative canine kit 1300 comprises a first container 1302. In FIG. 13, the alternative canine kit 1300 is shown in a lay-flat configuration, and placed within a bag 1304 having a re-sealable closure 1306. In FIG. 13, the alternative canine kit 1300 comprises one or more additional items. Examples of items include a food product 1308 that is suited for use as a canine treat, an edible composition 1310 that is suited for use as a canine dental cleaning agent, a fiber product 1312, a composition 1314 comprising a medicament, a composition 1316 containing a fat, an instrument 1318 or tool suited for mixing or stirring liquid into rations, and/or other items previously described herein. Although not shown, one or more canine meal rations may be included in the alternative canine kit 1300, for example, as vacuum-sealed into separate pouches, for example. In some aspects, the one or more canine meal rations may be sealed into a container, pouch, or otherwise encapsulated using a hemp-based paper product (e.g., hemp-based cardboard), dried fish-based material (e.g., fish skin), an artificially-made or natural casing, and/or other edible membrane.

The alternative canine kit 1300 may be configured to remain in a lay-flat configuration and may include any or all of the features and aspects previously described above, however, the alternative canine kit 1300 may lack an enclosed volume. The alternative canine kit 1300 may be configured to remain in a lay-flat configuration and may have a comparatively low profile to the other aspects of the canine multi-meal kit discussed herein. In FIGS. 14-15, the first container 1302 is shown in an expanded or un-collapsed, second configuration. When expanded, a portion of the first container 1302 forms a base 1320 and another portion of the first container 1302 forms a sidewall 1322. Together, the base 1320 and sidewall 1322 define a first container volume, into which water or a canine meal may be placed, as previously described herein. In some aspects, the first container 1302 may further comprise a non-permeable membrane (e.g., comprises of a water-proof or water-resistant material), as shown in FIG. 15. In some aspects, the first container 1302 comprises a material that is disposable, for example, as intended for one time use. In some aspects, the material is a paper-type product, with or without a plastic-based liner. In some aspects, the first container 1302 may be any size, shape, color, and/or dimension(s) suitable for serving a canine meal. As such, the first container 1302 may be any size or shape. Examples of shapes include a circle, oval, square, hexagon, and/or octagon, such that the shape provided in FIG. 13 is merely illustrative examples and are not limiting.

Figure 16:
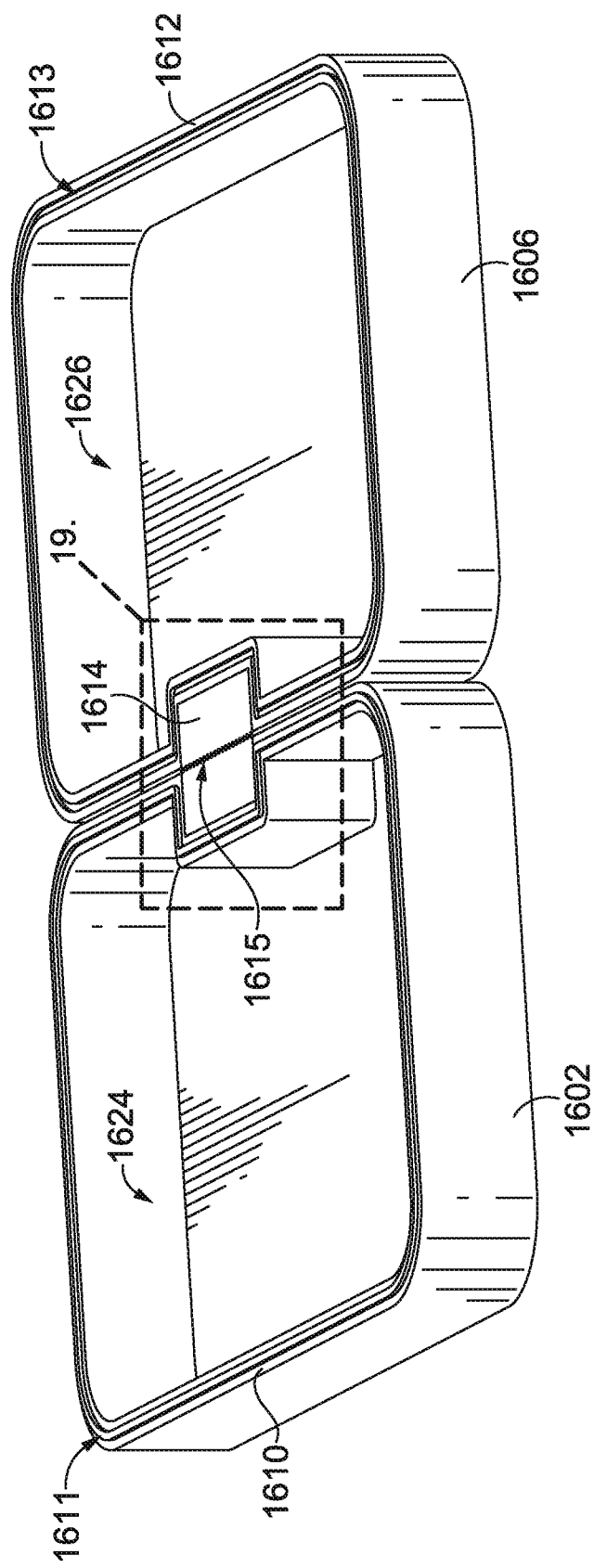
FIG. 16 depicts a perspective view of a canine multi-meal kit in one configuration, in accordance with an aspect herein.
Figure 17:
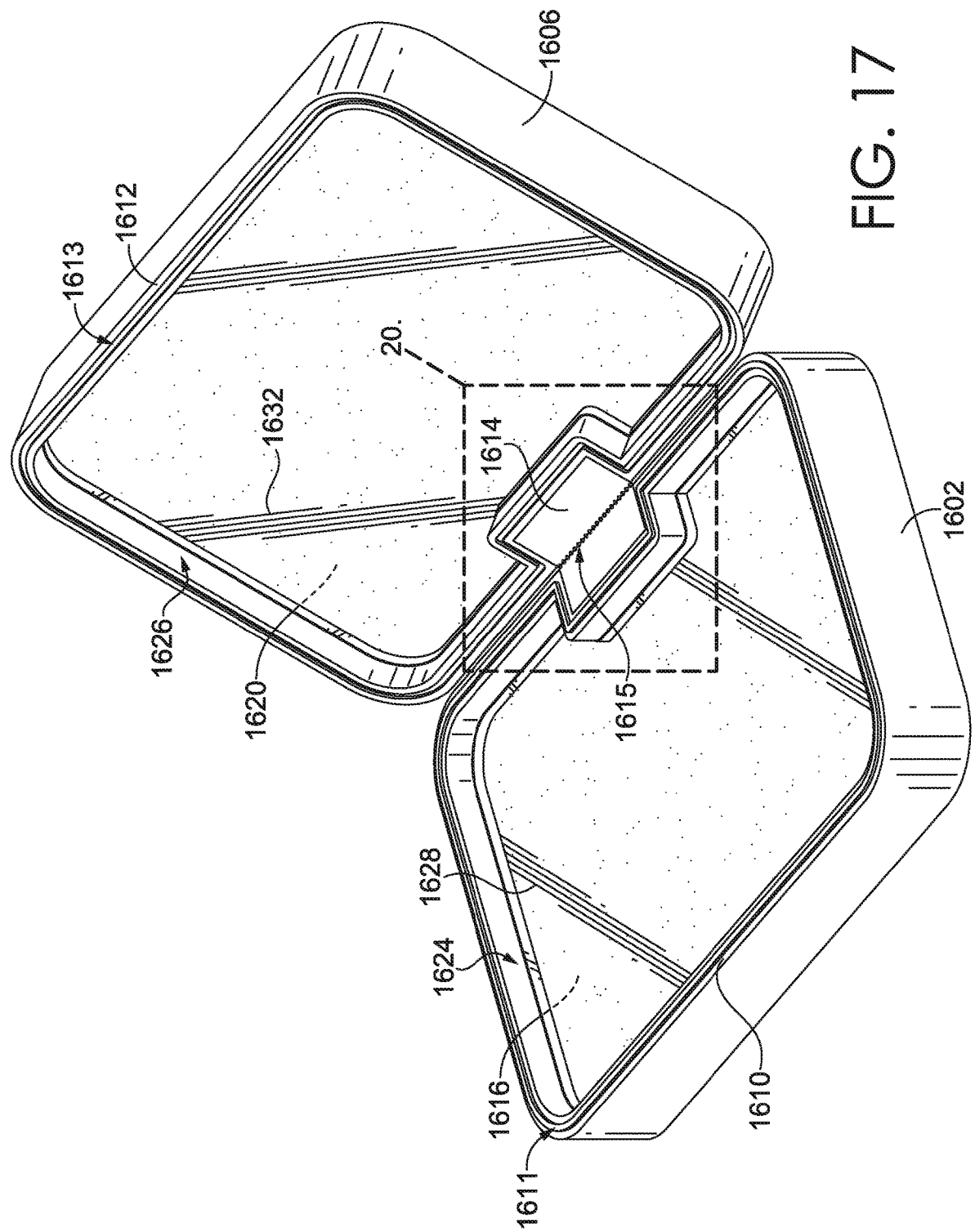
FIG. 17 depicts a perspective view of the canine multi-meal kit of FIG. 16 in an intermediate configuration, in accordance with an aspect herein.
Figure 18:
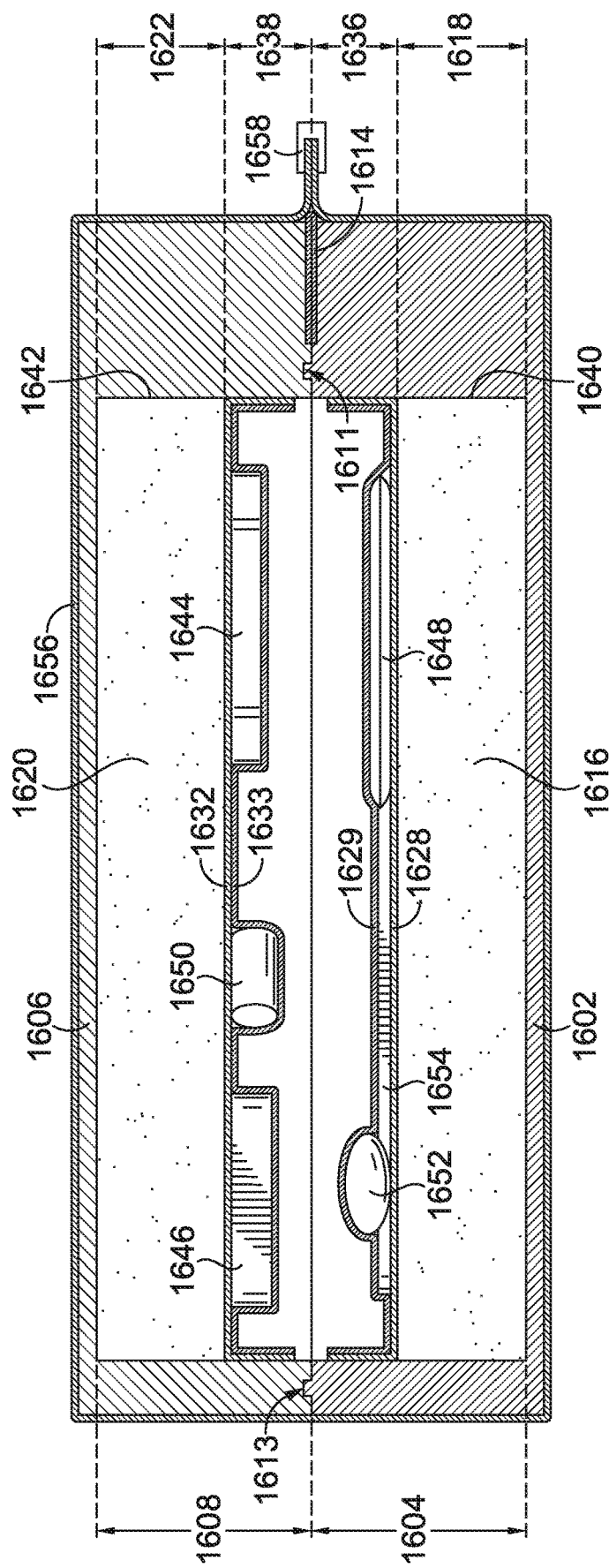
FIG. 18 depicts a cross-section view of the canine multi-meal kit of FIG. 16 in a second configuration, in accordance with an aspect herein.
Figure 19:
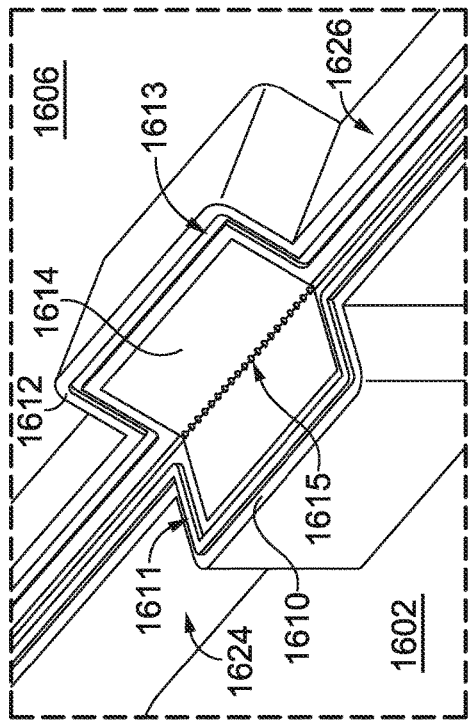
FIG. 19 depicts a detail view of a portion of the canine multi-meal kit of FIG. 16 in one configuration, in accordance with an aspect herein.
Figure 20:
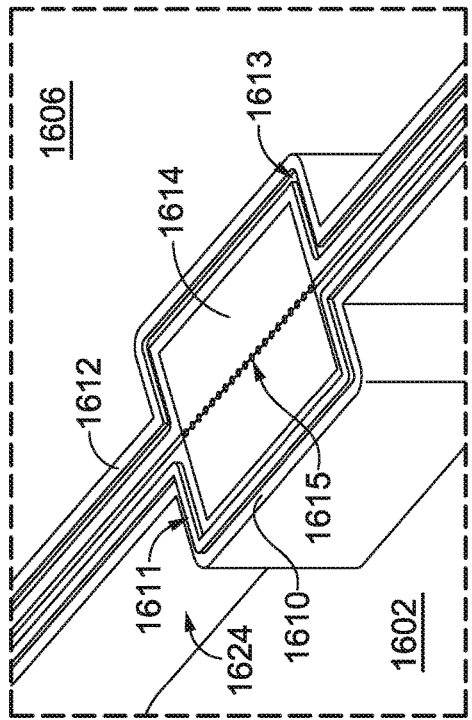
FIG. 20 depicts a detail view of a portion of the canine multi-meal kit of FIG. 16 in an intermediate configuration, in accordance with an aspect herein.

Continuing, FIGS. 16-18 depict another example of a canine multi-meal kit 1600. It will be understood that the canine multi-meal kit 1600 may comprise any or all of the previously described features, as previously discussed with regard to FIGS. 1-12. As such, the similar or same features present in the canine multi-meal kit 1600 are not discussed in detail here for brevity.

Further, it will be understood that the canine multi-meal kit 1600 may have additional features, as discussed below, such as one or more additional containment structures, such as a membrane. The canine multi-meal kit 1600 is shown in different configurations, such as a first lay-flat configuration (FIG. 16), a second enclosed configuration (FIG. 18), and an third intermediate configuration (FIG. 17), for illustration of the full-range of motion about the bridge portion 1614, wherein the perforations 1615 serve as a point of flexion. The canine multi-meal kit 1600 is also shown without contents (FIG. 16), with partial contents (FIG. 17, showing rations), and with all or nearly all contents (FIG. 18, showing rations and additional items) in place, for the purposes of discussion and to provide clear views of the interior of the containers and layered contents.

In aspects, the canine multi-meal kit 1600 comprises a first container 1602. The first container 1602 has a first container volume 1604. The first container volume 1604 refers to the total volume provided within the first container 1602 when the first container 1602 is empty or lacks contents, as shown in FIG. 16. In another aspect, the first container volume 1604 may be defined as the total volume enclosed by the first container 1602 with a plane extending across and spanning the first flange 1610 of the first container 1602. The canine multi-meal kit 1600 further comprises a second container 1606. The second container 1606 has a second container volume 1608. The second container volume 1608 refers to the total volume provided within the second container 1606 when the second container 1606 is empty, and the second container volume 1608 may be defined as the total volume enclosed by the second container 1606 with a plane extending across and spanning the second flange 1612 of the second container 1606. The first container 1602 and the second container 1606 may comprise any of the materials, shapes, size, and the like as previously described herein. In some aspects, the first container 102 and the second container 106 may be the same in size, shape, color, and/or dimension(s). Examples of shapes include a circle, oval, square, hexagon, rectangle, and/or octagon, such that the shapes provided in FIGS. 16-18 are merely illustrative examples and are not limiting. As used herein, it will be understood that the containers are three-dimensional, albeit they may be described herein for simplicity using two-dimensional shapes (i.e., a circle versus a half-sphere).

When the first and second containers 1602 and 1606 are selectively mated to one another, the first container volume 1604 and the second container volume 1608 are enclosed, as shown in FIG. 18. In some aspects, the first flange 1610 comprises a first flange projection 1611 that extends outward from the first flange 1610. The second container 1606 comprises, in such aspects, a second flange channel 1613 or groove that extends inward or recesses into the second flange 1612 to form a recess. In some aspects, the first flange projection 1611 may engage and/or mate with the second flange channel 1613, for example, using contact-based friction. In aspects, first flange projection 1611 and the second flange channel 1613 are complementary in size and shape. Accordingly, the dimensions (i.e., size, shape, height, width, depth of recess of the channel) of the second flange channel 1613 may mirror the dimensions of the first flange projection 1611, in aspects, such that the first flange projection 1611 may be inserted (e.g., a slip fit) into the second flange channel 1613. In some aspects, the structural rigidity and/or surface texture of the first flange projection 1611 and/or the second flange channel 1613 create a snug slip-fit (e.g., contact-based friction securing the engagement) so that the first flange projection 1611 is retained within the second flange channel 1613 after mating.

Though shown as continuously circumnavigating each corresponding container, it will be understood that, in other aspects, the first flange projection 1611 and/or the second flange channel 1613 are not continuous. For example, the first flange projection 1611 may comprise a plurality of projections and the second flange 1612 may comprise a plurality of channels, that may be placed intermittently or periodically at mirrored locations along the perimeter of the corresponding containers, such that the plurality of projections may mate with the plurality of channels. In FIG. 17, the first flange projection 1611 has unrounded edges and the second flange channel 1613 is unrounded in shape, for example, such that a tight fit is created when the two are mated completely and/or partially. In aspects, the first flange projection 1611 mates with and engages the second flange channel 1613 to form a continuous seal along the perimeters of the first container 1602 and the second container 1606, for example, as shown in the cross-section of FIG. 18.

The canine multi-meal kit 1600 is not limited to utilizing a contact-based friction fit, however. It is contemplated that one or more materials may be disposed between the respective flange(s), channel(s), and/or projection(s) when in a mated, enclosed configuration. The one or more materials may include for example one or more of an adhesive, mechanical bonding materials, sealants, gaskets, containment structures, and/or the like.

Figure 21:
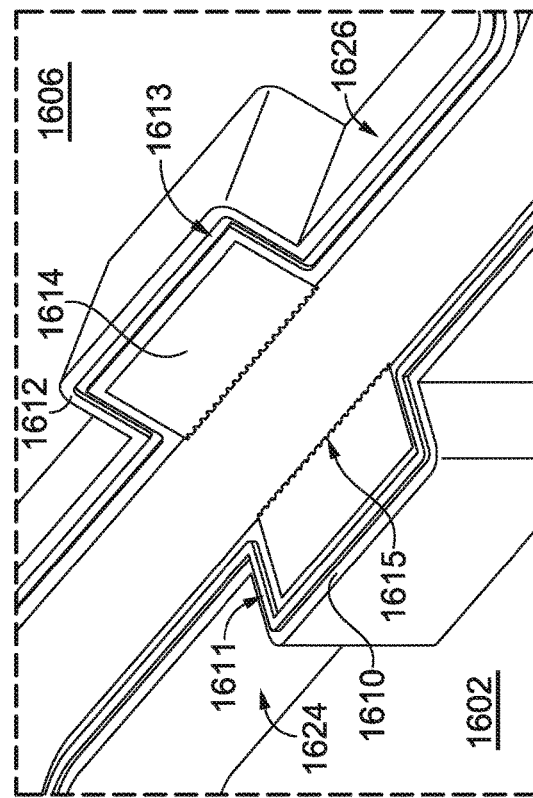
FIG. 21 depicts a detail view of a portion of the canine multi-meal kit of FIG. 16 in a second configuration, in accordance with an aspect herein

In aspects, the canine multi-meal kit 1600 includes a bridge portion 1614, similar to those previously described. The bridge portion 1614 is coupled to the first container 1602 and the second container 1606 and may stabilize the canine multi-meal kit 1600 in the enclosed configuration by acting to link the first container 1602 and the second container 1606 to one another. As shown in FIGS. 16-18, the bridge portion 1614 includes one or more perforations 1615 or indentations. The perforations 1615 or indentations weaken the material of the bridge portion 1614 such that bridge portion 1614 may be bent like a hinge, as shown in FIG. 17, and further, the bridge portion 1614 be torn and separated into two or more portions, for example, as shown in FIG. 21. As previously discussed, when the bridge portion 1614 is separated into two or more portions using the one or more perforations 1615, the first container 1602 and the second container 1606 are no longer linked and may be moved independent from one another. For example, by untethering the first and second containers 1602 and 1606 from one another, one of the containers may be used to serve a ration to a canine while the other container and ration are kept away from the canine and reserved for a later canine meal.

In aspects, the first flange 1610 and first flange projection 1611 follow the perimeter of the first container 1602 interiorly around the bridge portion 1614, such that the first flange 1610 and first flange projection 1611 are continuous and uninterrupted by the bridge portion 1614. Similarly, the second flange 1612 and the second flange channel 1613 follow the perimeter of the second container 1606 interiorly around the bridge portion 1614, such that the second flange 1612 and the second flange channel 1613 are continuous and uninterrupted by the bridge portion 1614, in some aspects. In this manner, the first flange projection 1611 of the first container 1602 may be mated to the second flange channel 1613 of the second container 1606 such that the bridge portion 1614 may not physically interrupt, disrupt, or break a seal created by the engagement of the first flange projection 1611 with the second flange channel 161, as shown in FIG. 18.

Continuing, the canine multi-meal kit 1600 further comprises a first dry food ration 1616 of a first dry food ration volume 1618 and a second dry food ration 1620 of a second dry food ration volume 1622, which, as previously discussed, are respectively stowed in the first container 1602 and the second container 1606, in aspects. The first dry food ration 116 is vacuumed sealed into the first container 1602 by a first containment structure 1628, and the second dry food ration 1620 is vacuum-sealed into the second container 1606 by a second containment structure 1632, in various aspects. As such, in some aspects, the first dry food ration 1616 contacts the interior surface 1624 of the first container 1602 and the interior surface 1630 of first containment structure 1628, while the second dry food ration 1620 contacts the interior surface 1626 of the second container 1606 and the interior surface 1634 of the second containment structure 1632. It is contemplated that aspects of the previously-described containment structures are contemplated to be within the scope of the canine multi-meal kit 1600 of FIGS. 16-18.

As illustrated in FIG. 18, the remaining volume 1636 of the first container volume 1604 may be visualized using the interior surface 1624 of the sidewall 1640 of the first container 1602, from the first flange 1610 to the first containment structure 1628. Similarly, the remaining volume 1638 of the second container volume 1608 may be measured along the interior surface 1626 of the sidewall 1642 of the second container 1606, from the second flange 1612 to the second containment structure 1632, for example, as shown by brackets in FIG. 18. In further aspects, either alone or in combination, the remaining volume 1636 of the first container 1602 and the remaining volume 1638 of the second container 1606 provide additional storage space within the canine multi-meal kit 1600.

For example, one or more items are stored within the remaining volume 1636 of the first container volume 1604 and the remaining volume 1638 of the second container 1606 when the canine multi-meal kit 1600 is in the enclosed configuration shown in FIG. 18. The one or more items may comprise, in some aspects, a food product 1644, an edible composition 1646, a fiber product 1648, a composition 1650 comprising a medicament suited for alleviating canine pests, a composition 1652 containing a fat, and/or an instrument 1654 or tool suited for mixing or stirring liquid into rations, which are the same or similar to those previously discussed in detail with regards to FIGS. 1-12.

In aspects, in order to reduce and/or mitigate noise caused by movement and/or shifting of the one or more items stowed in the canine multi-meal kit 1600 during transport, the one or more items are vacuum-sealed within the first container 1602 using a third containment structure 1629. In such an aspect, the one or more items are placed under compression between the third containment structure 1629 and the first containment structure 1628 within the first container 1602, as shown in FIG. 18. In further aspects, and optionally, one or more items are vacuum-sealed within the second container 1606 using a fourth containment structure 1633. In such an aspect, the one or more items are placed under compression between the fourth containment structure 1633 and the second containment structure 1632 within the second container 1606, as shown in FIG. 18. The third containment structure 1629 and/or the fourth containment structure 1633 may have the same structural and/or chemical features, may comprise one or more of the same or similar materials, and the like, as has been previously discussed herein with regard to other containment structures. By vacuum-sealing the one or more items in place, the movement and/or shifting of the one or more items caused during transport is reduced or prevent, such that the canine multi-meal kit 1600 is quiet and/or nearly noiseless when transported or jostled.

In some aspects, the canine multi-meal kit 1600 may be stored in or encapsulated within a structure, such as a bag 1656 having a re-sealable closure 1658, as previously described herein and shown in FIG. 18. The bag 1656 may be transparent, semi-transparent, color tinted, or opaque, in various aspects, similar or the same to other bags discussed previously. In aspects, the bag 1656 is initially vacuum sealed, thus providing additional protection (e.g., fail safe) for the one or more items and the dry food rations in the event that the seal of any of the interiorly-located containment structures may become compromised. The re-sealable closure 1658 may be used to repeatedly open and close the bag 1656 multiple times with fidelity such that the bag 1656 may be used and re-used. In further aspects, the bag 1656 may be color-coded to identify the flavor profile of food rations.

The disclosure provided above is intended to illustrate some possible combinations of various aspects associated with a canine multi-meal kit. Those skilled in the art will understand, however, that within each aspect, some features may be optional. Moreover, different features discussed in different aspects could be combined in still other aspects and would still fall within the scope of the attached claims. Some features could be used independently in some aspects, while still other features could be combined in various different ways in still other aspects. The purpose served by the disclosure, however, is to provide an example of the various features and concepts related to the aspects described herein, not to limit the scope thereof. One skilled in the relevant art will recognize that numerous variations and modifications may be made to the configurations and dry food rations described above without departing from the scope of aspects described herein, as defined by the claims.

What is claimed is:

1. A canine multi-meal kit comprising:
a first container having a first container volume;
a second container having a second container volume, the second container and the first container configured to selectively mate to enclose the first container volume and the second container volume;
a first dry food ration of a first dry food ration volume;
a second dry food ration of a second dry food ration volume;
a first containment structure disposed in the first container and selectively forming an air-tight volume for maintaining the first dry food ration in the first container such that the first dry food ration contacts the first container and the first containment structure, wherein the first dry food ration volume is less than the first container volume, wherein the first dry food ration is under compression between the first container and the first containment structure when the first containment structure is selectively forming the air-tight volume, wherein the first containment structure partitions the first container volume into the air-tight volume occupied by the first dry food ration volume and a first unoccupied volume of the first container volume that is not occupied by the first dry food volume, wherein the first containment structure has an interior surface and an exterior surface opposing the interior surface, wherein the interior surface of the first containment structure defines the air-tight volume of the first container and the exterior surface of the first containment structure defines the first unoccupied volume of the first container volume;
a second containment structure disposed in the second container and selectively forming an air-tight volume for maintaining the second dry food ration in the second container such that the second dry food ration contacts the second container and the second containment structure, wherein the second dry food ration volume is less than the second container volume; and
an edible composition having a flavor profile that is different from a flavor profile of the first dry food ration, and wherein the edible composition is maintained between the first containment structure and the second containment structure when the second container and the first container are selectively mated.

2. The canine multi-meal kit of claim 1, wherein the first container has an interior surface and the first containment structure has an interior surface, wherein the first containment structure is attached to the interior surface when selectively forming the air-tight volume, and wherein the first dry food ration contacts the interior surface of the first container and the interior surface of first containment structure.

3. The canine multi-meal kit of claim 2, wherein the first container has a flange, and wherein the first containment structure is attached to at least a portion of the first container interior surface and the flange when selectively forming the air-tight volume of the first container.

4. The canine multi-meal kit of claim 1, wherein the second container has an interior surface and the second containment structure has an interior surface, wherein the second containment structure is attached to the interior surface when selectively forming the air-tight volume, and wherein the second dry food ration contacts the interior surface of the second container and the interior surface of second containment structure.

5. The canine multi-meal kit of claim 4, wherein the second container has a flange, and wherein the second containment structure is attached to at least a portion of the second container interior surface and the flange when selectively forming the air-tight volume of the second container.

6. The canine multi-meal kit of claim 1, wherein the first containment structure comprises a non-permeable material formed from a polymeric composition comprising one or more of polypropylene, polypropene, polycarbonate, or polyvinyl chloride, wherein the first containment structure compressively fits within the first container for maintaining the selectively formed air-tight volumes.

7. The canine multi-meal kit of claim 1, wherein the first and second containment structures comprise a non-permeable material formed from a polymeric composition comprising or more of polyethene, polyester, polyvinyl chloride, or polyvinylidene chloride, wherein the first containment structure is secured under tension to the first container when selectively forming the air-tight volumes.

8. A canine multi-meal kit comprising:
a first container having a first container volume, the first container having an interior surface;
a first dry food ration of a first dry food ration volume disposed within the first container;
a first containment structure disposed in the first container, the first containment structure having an interior surface and an exterior surface opposing the interior surface, wherein the first containment structure is attached to at least a portion the interior surface of the first container when selectively forming an air-tight volume for maintaining the first dry food ration in the first container such that the first dry food ration contacts the first container and the first containment structure, wherein the first dry food ration volume is less than the first container volume, wherein the first dry food ration is under compression between the first container and the first containment structure when the first containment structure is selectively forming the air-tight volume, wherein the first containment structure partitions the first container volume into the air-tight volume occupied by the first dry food ration volume and a first unoccupied volume of the first container volume that is not occupied by the first dry food volume, wherein the interior surface of the first containment structure defines the air-tight volume of the first container and the exterior surface of the first containment structure defines the first unoccupied volume of the first container volume;
a second container having a second container volume, the second container having an interior surface, the second container and the first container configured to selectively mate to enclose the first container volume and the second container volume;
a second dry food ration of a second dry food ration volume disposed within the second container; and
a second containment structure disposed in the second container, the second containment structure having an interior surface and an exterior surface, wherein the second containment structure is attached to at least a portion of the interior surface of the second container when selectively forming an air-tight volume for maintaining the second dry food ration in the second container such that the second dry food ration contacts the second container and the second containment structure, wherein the second dry food ration volume is less than the second container volume; and an edible composition having a flavor profile that is different from a flavor profile of the first dry food ration, and wherein the edible composition is maintained between the first containment structure and the second containment structure when the second container and the first container are selectively mated.

9. The canine multi-meal kit of claim 8, wherein the first dry food ration and the second dry food ration, together, comprise approximately 3000 calories and 10 to 50 grams of protein.

10. The canine multi-meal kit of claim 8, wherein the first container and the second container selectively mate to enclose the first container volume and the second container volume, wherein one or more items are compressed between the first and second containment structures when in the enclosed configuration.

11. The canine multi-meal kit of claim 8, wherein the second dry food ration is under compression between the second container and the second containment structure when the second containment structure is selectively forming the air-tight volume of the second container.

12. The canine multi-meal kit of claim 11, and wherein the second containment structure partitions the second container volume into the air-tight volume occupied by the second dry food ration volume and a second unoccupied volume of the second container volume that is not occupied by the second dry food volume.

13. The canine multi-meal kit of claim 12, wherein the interior surface of the second containment structure defines the air-tight volume of the second container and the exterior surface of the second containment structure defines the second unoccupied volume of the second container volume.

14. The canine multi-meal kit of claim 13, wherein one or more items are stored at least partially within the first unoccupied volume of the first container volume and the second unoccupied volume of the second container when in the enclosed configuration.

15. The canine multi-meal kit of claim 13, wherein the first unoccupied volume of the first container volume is larger than the air-tight volume of the first container volume, and wherein the second unoccupied volume of the second container volume is larger than the air-tight volume of the second container volume.

16. The canine multi-meal kit of claim 13, wherein the first unoccupied volume of the first container volume is less than the air-tight volume of the first container volume, and wherein the second unoccupied volume of the second container volume is less than the air-tight volume of the second container volume.

17. A canine multi-meal kit comprising:
a first container having a first container volume, the first container having an interior surface;
a first dry food ration of a first dry food ration volume disposed within the first container;
a first containment structure disposed in the first container, the first containment structure having an interior surface and an exterior surface opposing the interior surface, wherein the first containment structure is attached to at least a portion of the interior surface of the first container when selectively forming an air-tight volume for maintaining the first dry food ration in the first container such that the first dry food ration contacts the first container and the first containment structure, wherein the first containment structure partitions the first container volume into the air-tight volume occupied by the first dry food ration volume and a first unoccupied volume of the first container volume that is not occupied by the first dry food volume, wherein the first dry food ration volume is less than the first container volume, wherein the first dry food ration is under compression between the first container and the first containment structure when the first containment structure is selectively forming the air-tight volume, wherein the first containment structure partitions the first container volume into the air-tight volume occupied by the first dry food ration volume and a first unoccupied volume of the first container volume that is not occupied by the first dry food volume, wherein the interior surface of the first containment structure defines the air-tight volume of the first container and the exterior surface of the first containment structure defines the first unoccupied volume of the first container volume;
a second container having a second container volume, the second container having an interior surface, the second container and the first container configured to selectively mate to enclose the first container volume and the second container volume;
a second dry food ration of a second dry food ration volume disposed within the second container;
a second containment structure disposed in the second container, the second containment structure having an interior surface, wherein the second containment structure is attached to at least a portion of the interior surface of the second container when selectively forming an air-tight volume for maintaining the second dry food ration in the second container such that the second dry food ration contacts the second container and the second containment structure, wherein the second containment structure partitions the second container volume into the air-tight volume occupied by the second dry food ration volume and a second unoccupied volume of the second container volume that is not occupied by the second dry food volume, and wherein the second dry food ration volume is less than the second container volume; and
an edible composition having a flavor profile that is different from a flavor profile of the first dry food ration, and wherein the edible composition is maintained between the first containment structure and the second containment structure when the second container and the first container are selectively mated,
wherein one or more items are stored at least partially within the first unoccupied volume of the first container volume and the second unoccupied volume of the second container when in the enclosed configuration.

* * * * *